US012799392B2

(12) United States Patent
Niko et al.

(10) Patent No.: US 12,799,392 B2
(45) Date of Patent: Nov. 17, 2026

(54) COMPOUND, FLUORESCENT DYE, KIT, AND METHOD FOR DETECTING CELLS

(71) Applicants: NATIONAL UNIVERSITY CORPORATION KOCHI UNIVERSITY, Kochi (JP); NATIONAL UNIVERSITY CORPORATION EHIME UNIVERSITY, Ehime (JP)

(72) Inventors: Yosuke Niko, Kochi (JP); Kazuki Inoue, Kochi (JP); Taku Nakayama, Kochi (JP); Shingo Hadano, Kochi (JP); Shigeru Watanabe, Kochi (JP); Masamoto Murakami, Ehime (JP); Ryosuke Kawakami, Ehime (JP); Teruko Tsuda, Ehime (JP); Koji Sayama, Ehime (JP); Takeshi Imamura, Ehime (JP)

(73) Assignees: NATIONAL UNIVERSITY CORPORATION KOCHI UNIVERSITY, Kochi (JP); NATIONAL UNIVERSITY CORPORATION EHIME UNIVERSITY, Ehime (JP)

( * ) Notice: Subject to any disclaimer, the term of this patent is extended or adjusted under 35 U.S.C. 154(b) by 511 days.

(21) Appl. No.: 18/288,447

(22) PCT Filed: Mar. 2, 2022

(86) PCT No.: PCT/JP2022/008939

§ 371 (c)(1),
(2) Date: Oct. 26, 2023

(87) PCT Pub. No.: WO2022/230354

PCT Pub. Date: Nov. 3, 2022

(65) Prior Publication Data

US 2024/0218242 A1 Jul. 4, 2024

(30) Foreign Application Priority Data

Apr. 26, 2021 (JP) ................................ 2021-073923

(51) Int. Cl.
*C09K 11/06* (2006.01)
*C09B 3/70* (2006.01)

(52) U.S. Cl.
CPC ................ *C09K 11/06* (2013.01); *C09B 3/70* (2013.01); *C09K 2211/1011* (2013.01)

(58) Field of Classification Search
CPC ........................................................ C09B 3/70
See application file for complete search history.

(56) References Cited

U.S. PATENT DOCUMENTS

2012/0015399 A1 1/2012 Yamada et al.

FOREIGN PATENT DOCUMENTS

EP 4212601 A1 7/2023
EP 4332094 A1 6/2024
(Continued)

OTHER PUBLICATIONS

European Search Report issued for Application No. 21866714.5 dated Dec. 13, 2024.

(Continued)

*Primary Examiner* — Peter F Godenschwager
(74) *Attorney, Agent, or Firm* — Meunier Carlin & Curfman LLC

(57) ABSTRACT

The present invention aims at providing a compound that can be suitably used as a fluorescent dye or the like, a novel fluorescent dye and kit for easily detecting cells, a novel method for easily detecting cells or the like, and so on. A compound represented by the following formula (1) or a salt thereof:

(Continued)

[Formula 1]

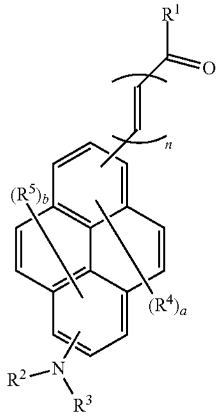

(1)

in the formula (1), $R^1$ is a substituted or unsubstituted alkyl group having 1 to 12 carbon atoms or the like;

$R^2$ and $R^3$ are each independently a substituted or unsubstituted alkyl group having 1 to 6 carbon atoms or the like;

$R^4$ and $R^5$ are each independently an alkyl group having 1 to 12 carbon atoms or the like;

n is an integer of 1 to 4; and a and b are each independently an integer of 0 to 4.

15 Claims, 11 Drawing Sheets

(56) References Cited

FOREIGN PATENT DOCUMENTS

| | | | |
|---|---|---|---|
| JP | 2009063566 | A1 | 3/2009 |
| JP | 2018-201678 | A | 12/2017 |
| JP | 2020150559 | A | 9/2020 |
| WO | 199825598 | A1 | 6/1998 |
| WO | 2010090265 | A1 | 8/2010 |
| WO | 2019093400 | A1 | 5/2019 |
| WO | 2022054755 | A1 | 3/2022 |

OTHER PUBLICATIONS

Office Action for Canadian Application No. 3191858 dated Jan. 15, 2025.

International Search Report and Written Opinion for corresponding International Patent Application No. PCT/JP2022/008939, mailed May 10, 2022, 2 pp.

Valanciunaite, J. et al., Polarity mapping of cells and embryos by improved fluorescent solvatochromic pyrene probe, Analytical Chemistry, Mar. 10, 2020, 92, 6512-6520, 9 pp.

Maggio, E. et al., An expression for the brirge-mediated electron transfer rate in dye-sensitized solar cells, Philosophical Transactions of the Royal Society A, 2014, 372, Nov. 2013, http://dx.doi.org/10.1098/rsta.2013.0011, 13 pp.

Sumalekshmy S. et al, Intramolecular charge transfer processes in donor-acceptor substituted vinyltetrahydropyrenes, Photochemical & Photobiological Sciences, 2005, 4, 539-549, 8 pp.

International Search Report on and Written Opinion dated May 17, 2022 for related International Patent Application No. PCT/JP2021/032637 filed May 17, 2022.

Yin, J. et al, Two-photon fluorescence imaging of lipid drops polarity toward cancer diagnosis in living cells and tissue, Sensors and Actuators B. Chemical, Feb. 28, 2019, vol. 288, p. 251-258, 1-3, 5-7, Abstract, 2. Experimental, 3. Results, and discussion, 1,5-6.

Yang, X-Z. et al, The application of bioactive pyrazolopyrimidine unit for the construction of fluorescent biomarkers, Dyes and Pigments, Sep. 13, 2019, vol. 173/No. 107878, p. 1-7, 4, Abstract, 3. Results and discussion, 1-4.

Weil, T. et al, Water-Soluble Rylene Dyes as High-Performance Colorants for the Staining of Cells, Biomacromolecules, Aug. 12, 2004, vol. 6, p. 68-79.

International Preliminary Report on Patentability dated May 17, 2022, for International Patent Application No. PCT/JP2021/032637.

Amharref et al., Biochimica et Biophysica Acta, vol. 1768, No. 10, Oct. 9, 2007 (Oct. 9, 2007), pp. 2605-2615.

Salinas Michael et al , Biophysical Journal, vol. 118, No. 4, 16, Sep. 2019 (Sep. 16, 2019), pp. 885-897.

Maishi Nako et al, "Application of Polaric™ fluorophores in an in vivo tumor model.," Oncology Reports, vol. 30, No. 4, Oct. 2013 (Oct. 2013), pp. 1695-1700.

Andrey S. Klymchenko, Accounts of Chemical Research, vol. 50, No. 2, Jan. 9, 2017 (Jan. 9, 2017), pp. 366-375.

International Preliminary Report on Patentability for International Patent Application No. PCT/JP2022/008939, mailed Nov. 9, 2023.

European Office Action dated Aug. 9, 2024 issued in European Patent Application No. 21866714.5.

Extended European Search Report issued in European Application No. 21866714.5 on Mar. 7, 2025, 21 pages.

Notice of Reasons for Refusal issued in Japanese Application No. 2022-547582 on Jun. 12, 2025.

Office Action issued in Canadian application No. 3,191,858, dated Nov. 25, 2025, 5 pages.

Inoue, Kazuki et al. "Synthesis and photophysical properties of a new push-pull pyrene dye with green-to-far-red emission and its application to human cellular and skin tissue imaging." Journals of Materials Chemistry B, p. 1641-1649.

Extended European Search Report issued in European Application No. 22795277.7on Mar. 19, 2025, 12 pages.

Notice of Reasons for Refusal issued in Japanese Application No. 2023-517103 issued on May 16, 2025, 5 pages.

$^{1}$H NMR spectrum of PC ($CDCl_3$, 500 MHz)

$^{13}$C NMR spectra of PC ($CDCl_3$, 100 MHz)

COMPOUND, FLUORESCENT DYE, KIT, AND METHOD FOR DETECTING CELLS

TECHNICAL FIELD

The present invention relates to a fluorescent dye to be used for detecting cells, a compound that can be used for the fluorescent dye, a kit, a method for detecting cells, and so on.

BACKGROUND ART

In detection of cells, tissues, or the like, various staining methods are used, for example, to detect tumor cells. For example, hematoxylin and eosin (HE) staining is the most widely used in pathological diagnosis and is a gold standard in many diagnostic methods. However, in HE staining, because in addition to tumor cells, normal tissues are also stained, and light permeability is deteriorated, slices of a tissue specimen are required. Because a thin sliced specimen has only two-dimensional information, production and observation of many sections are required to determine the distribution range of tumor cells. In addition, production of a tissue specimen requires a high degree of skill, is complicated, and takes a long time.

Further, in HE staining, the boundary between tumor cells and normal tissues may have a low contrast and be obscure.

A method of obtaining a high-contrast tumor cell image by staining a specific tissue with an antibody to which a fluorescent dye, a radionuclide, metal particles or the like is bound is also known. However, because the antibody part does not pass through the cell membrane, a treatment for increasing membrane permeability is required, and the operation is complicated. In addition, the reagent is expensive.

Meanwhile, there has also been reported a means for detecting a skin disease by applying light without use of any staining dye and utilizing a difference in Raman scattering between an abnormal tissue and a normal tissue (see, for example, Patent Document 1). However, in a Raman scattering method, it is presumably difficult to determine the region of the tumor at the cellular level.

PRIOR ART DOCUMENTS

Patent Document

Patent Document 1: JP-A-2018-201678

SUMMARY OF THE INVENTION

Problems to be Solved by the Invention

An object of the present invention is to provide a compound that can be suitably used for a fluorescent dye or the like.

Another object of the present invention is to provide a novel fluorescent dye and kit for easily detecting cells or the like.

Still another object of the present invention is to provide a novel method for easily detecting cells or the like.

Means for Solving the Problems

The present inventors have found that cells or the like can be easily detected by applying a fluorescent dye including a compound that exhibits solvatochromism to staining of a cell or tissue, and have accomplished the present invention.

That is, the present invention provides the following compounds.

[1]

A compound represented by the following formula (1) or a salt thereof:

[Formula 1]

(1)

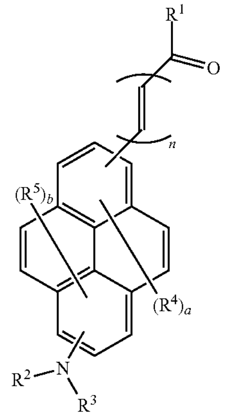

in the formula (1), $R^1$ is a substituted or unsubstituted alkyl group having 1 to 12 carbon atoms, a substituted or unsubstituted alkenyl group having 2 to 12 carbon atoms, a substituted or unsubstituted alkynyl group having 2 to 12 carbon atoms, or a hydrophilic substituent containing one or more atoms selected from the group consisting of boron, nitrogen, oxygen, phosphorus, sulfur, and halogen;

$R^2$ and $R^3$ are each independently a substituted or unsubstituted alkyl group having 1 to 6 carbon atoms, a substituted or unsubstituted alkenyl group having 2 to 6 carbon atoms, a substituted or unsubstituted alkynyl group having 2 to 6 carbon atoms, or a hydrophilic substituent containing one or more atoms selected from the group consisting of boron, nitrogen, oxygen, phosphorus, sulfur, and halogen, and $R^2$ and $R^3$ may form one ring structure together;

$R^4$ and $R^5$ are each independently an alkyl group having 1 to 12 carbon atoms, an alkenyl group having 2 to 12 carbon atoms, an alkynyl group having 2 to 12 carbon atoms, an aryl group having 5 to 12 carbon atoms, a heteroaryl group having 5 to 12 carbon atoms, a halogen atom, or a hydrophilic substituent containing one or more atoms selected from the group consisting of boron, nitrogen, oxygen, phosphorus, sulfur, and halogen;

n is an integer of 1 to 4; and a and b are each independently an integer of 0 to 4.

[2]

The compound according to [1] or a salt thereof, wherein n is 1 or 2.

[3]

The compound according to [1] or [2] or a salt thereof, wherein $R^1$ is a methyl group, an ethyl group, a n-propyl group, an i-propyl group, a n-butyl group, an i-butyl group, a sec-butyl group, or a t-butyl group.

[4]

The compound according to any one of [1] to [3] or a salt thereof, wherein $R^2$ and $R^3$ are each independently a methyl group, an ethyl group, a n-propyl group, an i-propyl group, a n-butyl group, an i-butyl group, a sec-butyl group, or a t-butyl group each of which is substituted or unsubstituted with a carboxyl group, a hydroxy group, a sulfo group, an amide group, a halogen atom, or a group being a salt of a carboxyl group, a hydroxy group, a sulfo group, an amide group, or a halogen atom.

[5]

The compound according to any one of [1] to [3] or the salt thereof, wherein $R^2$ and $R^3$ represent together a divalent cyclic hydrocarbon group having 3 to 12 carbon atoms that is constituted by combining $R^2$ and $R^3$ together with the carbon atoms to which $R^2$ and $R^3$ are bound and that is substituted or unsubstituted with a carboxyl group, a hydroxy group, a sulfo group, an amide group, a halogen atom, or a group being a salt of a carboxyl group, a hydroxy group, a sulfo group, an amide group, or a halogen atom.

[6]

The compound according to any one of [1] to [5] or a salt thereof, wherein $R^4$ and $R^5$ are each independently a methyl group, an ethyl group, a hydroxyl group, or an amino group.

[7]

The compound according to any one of [1] to [6] or a salt thereof, wherein an absorption maximum wavelength thereof is 300 to 550 nm in a 20 mM phosphate buffer (pH 7.4) at 25 °C.

[8]

The compound according to any one of [1] to [7] or a salt thereof, having a molecular weight of 700 or less.

In addition, the present invention also provides the following fluorescent dyes.

[9]

A fluorescent dye comprising the compound according to any one of [1] to [8] or a salt thereof.

[10]

The fluorescent dye according to [9], which is for morphological detection of cells.

[11]

The fluorescent dye according to [9], which is for staining or visualization of a biological sample.

[12]

The fluorescent dye according to any one of [9] to [11], which is for fluorescence imaging.

The present invention also provides the following kit.

[13]

A kit including the fluorescent dye according to any one of [9] to [12].

The present invention also provides the following methods for detecting cells.

[14]

A method for detecting cells, comprising step (1) of staining a cell with a fluorescent dye including the compound according to any one of [1] to [8] or a salt thereof.

[15]

The method for detecting cell according to [14], including, after the step (1), step (2) of performing evaluation using fluorescence spectra measured in two or more solvents, respectively.

[16]

The method for detecting cells according to [15], wherein the step (2) is performed using fluorescence imaging.

Effect of the Invention

The compound of the present invention can be suitably used for a fluorescent dye or the like.

In addition, cells and the like can be easily and quickly stained by using the fluorescent dye and kit of the present invention.

In addition, cells and the like can be easily detected by using the method for detecting cells of the present invention.

MODE FOR CARRYING OUT THE INVENTION

Figure 1:
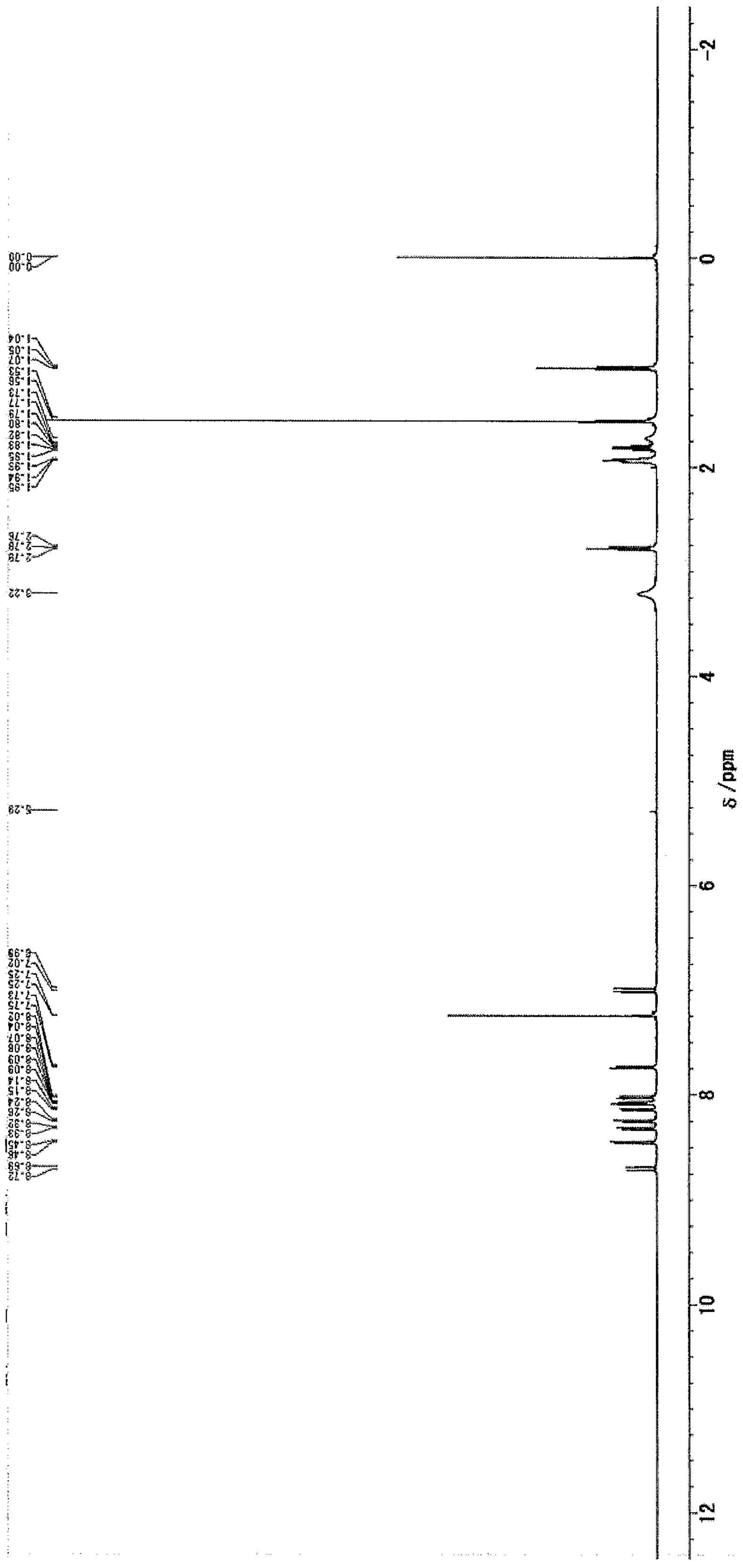
FIG. 1 is a chart of $^1$H NMR spectrum measurement of the compound A in an Example.

Hereinafter, embodiments of the present invention will be described in detail, but the present invention is not limited to these embodiments.

Compound

The compound of the present invention is a compound represented by the following formula (1) (hereinafter, also referred to as "compound (1)") or a salt thereof:

[Formula 2]

(1)

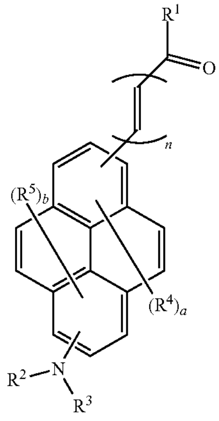

in the formula (1), $R^1$ is a substituted or unsubstituted alkyl group having 1 to 12 carbon atoms, a substituted or unsubstituted alkenyl group having 2 to 12 carbon atoms, a substituted or unsubstituted alkynyl group having 2 to 12 carbon atoms, or a hydrophilic substituent containing one or more atoms selected from the group consisting of boron, nitrogen, oxygen, phosphorus, sulfur, and halogen;

$R^2$ and $R^3$ are each independently a substituted or unsubstituted alkyl group having 1 to 6 carbon atoms, a substituted or unsubstituted alkenyl group having 2 to 6 carbon atoms, a substituted or unsubstituted alkynyl group having 2 to 6 carbon atoms, or a hydrophilic substituent containing one or more atoms selected from the group consisting of boron, nitrogen, oxygen, phosphorus, sulfur, and halogen, and $R^2$ and $R^3$ may form one ring structure together;

$R^4$ and $R^5$ are each independently an alkyl group having 1 to 12 carbon atoms, an alkenyl group having 2 to 12 carbon atoms, an alkynyl group having 2 to 12 carbon atoms, an aryl group having 5 to 12 carbon atoms, a heteroaryl group having 5 to 12 carbon atoms, a halogen atom, or a hydrophilic substituent containing one or more atoms selected from the group consisting of boron, nitrogen, oxygen, phosphorus, sulfur, and halogen;

n is an integer of 1 to 4; and a and b are each independently an integer of 0 to 4.

The compound (1) may be a compound that exhibits solvatochromism, and can be suitably used, for example, as a fluorescent dye. The "compound that exhibits solvatochromism" referred to herein represents a compound whose absorption maximum wavelength or fluorescence maximum wavelength or both thereof change depending on a change in polarity (hydrophobicity) around the compound.

The aforementioned compound also includes, as appropriate, derivatives thereof, such as a substituted product formed by substituting a part or the whole of the structure thereof and solvates such as a hydrate.

In the formula (1), $R^1$ is a substituted or unsubstituted alkyl group having 1 to 12 carbon atoms, a substituted or unsubstituted alkenyl group having 2 to 12 carbon atoms, a substituted or unsubstituted alkynyl group having 2 to 12 carbon atoms, or a hydrophilic substituent containing one or more atoms selected from the group consisting of boron, nitrogen, oxygen, phosphorus, sulfur, and halogen.

Examples of the alkyl group having 1 to 12 carbon atoms represented by $R^1$ include a linear or branched alkyl group, and examples thereof include a methyl group, an ethyl group, a n-propyl group, an isopropyl group, a n-butyl group, an iso-butyl group, a sec-butyl group, a tert-butyl group, a pentyl group, an isopentyl group, a neopentyl group, a n-hexyl group, a n-heptyl group, a n-octyl group, a n-nonyl group, a n-decanyl group, a n-undecanyl group, and a n-dodecanyl group. Preferable examples of the alkyl group having 1 to 12 carbon atoms represented by $R^1$ include alkyl groups having 2 to 10 carbon atoms, alkyl groups having 3 to 9 carbon atoms, or the like.

Examples of the alkenyl group having 2 to 12 carbon atoms represented by $R^1$ include a linear or branched alkenyl group, and examples thereof include a vinyl group and an allyl group.

Examples of the alkynyl group having 2 to 12 carbon atoms represented by $R^1$ include a linear or branched alkenyl group, and examples thereof include an ethynyl group and a propargyl group.

Examples of the substituent of the alkyl group and the like represented by $R^1$ include a carboxyl group, a hydroxyl group, a sulfo group, an amide group, a halogen atom, and a group being a salt of a carboxyl group, a hydroxy group, a sulfo group, an amide group, or a halogen atom. When there are a plurality of substituents, these may be substituted singly, or may be substituted in combination of two or more thereof.

The hydrophilic substituent represented by $R^1$ is preferably a group containing one or more atoms selected from the group consisting of boron, nitrogen, oxygen, phosphorus, sulfur, and halogen from the viewpoint of improving solubility in water and promoting dispersion in cell membranes and cells. Among them, from the viewpoint of inhibiting reactions with biomolecules, the hydrophilic substituent preferably contains only one group or two or more groups selected from the group consisting of a tertiary amino group, a quaternary ammonium group, and a carbonyl group (excluding an aldehyde group).

In the formula (1), $R^2$ and $R^3$ are each independently a substituted or unsubstituted alkyl group having 1 to 6 carbon atoms, a substituted or unsubstituted alkenyl group having 2 to 6 carbon atoms, a substituted or unsubstituted alkynyl group having 2 to 6 carbon atoms, or a hydrophilic substituent containing one or more atoms selected from the group consisting of boron, nitrogen, oxygen, phosphorus, sulfur, and halogen, and $R^2$ and $R^3$ may form one ring structure together.

Examples of the alkyl group having 1 to 6 carbon atoms represented by $R^2$ and $R^3$ include a linear or branched alkyl group, and examples thereof include a methyl group, an ethyl group, a n-propyl group, an isopropyl group, a n-butyl group, an iso-butyl group, a sec-butyl group, a tert-butyl group, a pentyl group, an isopentyl group, a neopentyl group, and a n-hexyl group.

Examples of the alkenyl group having 2 to 12 carbon atoms represented by $R^2$ and $R^3$ include a linear or branched alkenyl group, and examples thereof include a vinyl group and an allyl group.

Examples of the alkynyl group having 2 to 12 carbon atoms represented by $R^2$ and $R^3$ include a linear or branched alkenyl group, and examples thereof include an ethynyl group and a propargyl group.

Examples of the substituent of the alkyl group and the like represented by $R^2$ and $R^3$ include a carboxyl group, a hydroxyl group, a sulfo group, an amide group, a halogen atom, or a group being a salt of a carboxyl group, a hydroxyl group, a sulfo group, an amide group, or a halogen atom. When there are a plurality of substituents, these may be substituted singly, or may be substituted in combination of two or more thereof.

As the hydrophilic substituents represented by $R^2$ and $R^3$, for example, those described in the section of the hydrophilic substituent represented by $R^1$ can be appropriately employed likewise.

In the formula (1), $R^2$ and $R^3$ may form one ring structure together. When $R^2$ and $R^3$ form one ring structure together, examples of the ring structure include a pyrrolidine ring structure, an imidazolidine ring structure, an oxazolidine ring structure, a piperidine ring structure, a piperazine ring structure, and a morpholine ring structure.

In the formula (1), $R^4$ and $R^5$ are each independently an alkyl group having 1 to 12 carbon atoms, an alkenyl group having 2 to 12 carbon atoms, an alkynyl group having 2 to 12 carbon atoms, an aryl group having 5 to 12 carbon atoms, a heteroaryl group having 5 to 12 carbon atoms, a halogen atom, or a hydrophilic substituent containing one or more atoms selected from the group consisting of boron, nitrogen, oxygen, phosphorus, sulfur, and halogen.

Examples of the alkyl group having 1 to 12 carbon atoms represented by $R^4$ and $R^5$ include a linear or branched alkyl group, and examples thereof include a methyl group, an ethyl group, a n-propyl group, an isopropyl group, a n-butyl group, an iso-butyl group, a sec-butyl group, a tert-butyl group, a pentyl group, an isopentyl group, a neopentyl group, a n-hexyl group, a n-heptyl group, a n-octyl group, a n-nonyl group, a n-decanyl group, a n-undecanyl group, and a n-dodecanyl group.

Examples of the alkenyl group having 2 to 12 carbon atoms represented by $R^4$ and $R^5$ include a linear or branched alkenyl group, and examples thereof include a vinyl group and an allyl group.

Examples of the alkynyl group having 2 to 12 carbon atoms represented by $R^4$ and $R^5$ include a linear or branched alkenyl group, and examples thereof include an ethynyl group and a propargyl group.

Examples of the aryl group having 5 to 12 carbon atoms represented by $R^4$ and $R^5$ include an aromatic hydrocarbon group having 5 to 12 carbon atoms, and examples thereof include a phenyl group, a tolyl group, a xylyl group, a naphthyl group, methylnaphthyl, anthracyl, and indenyl.

Examples of the heteroaryl group having 5 to 12 carbon atoms represented by $R^4$ and $R^5$ include an aromatic hydrocarbon group having 5 to 12 carbon atoms, and examples thereof include those in which one or more carbon atoms in the aromatic ring are replaced by a atom such as a nitrogen atom, an oxygen atom, or a sulfur atom. Examples thereof include a pyrrolyl group, a pyridinyl group, an imidazolyl group, a thienyl group, a furanyl group, a pyrazolyl group, an oxazolyl group, and a thiazolyl group.

Examples of the halogen atom represented by $R^4$ and $R^5$ include a fluorine atom, a chlorine atom, a bromine atom, and an iodine atom.

As the hydrophilic substituents represented by $R^4$ and $R^5$, for example, those described in the section of the hydrophilic substituent represented by $R^1$ can be appropriately employed likewise.

A preferable example is a case where in the above formula (1), $R^4$ and $R^5$ are each independently, for example, a methyl group, an ethyl group, a hydroxyl group, or an amino group.

In the above formula (1), n is an integer of 1 to 4.

In the above formula (1), a and b are each independently an integer of 0 to 4. When the sum of a and b is 2 or more, $R^4$ and $R^5$ present may be the same as each other, or may be a combination of two or more types.

As the compound (1), the following embodiments can be recited as examples, but the compound (1) is not limited thereto.

Embodiment 1

A compound represented by the above formula (1) or a salt thereof,

- wherein $R^1$ is a substituted or unsubstituted alkyl group having 1 to 12 carbon atoms;
- $R^2$ and $R^3$ are each independently a substituted or unsubstituted alkyl group having 1 to 6 carbon atoms;
- $R^4$ and $R^5$ are each independently an alkyl group having 1 to 12 carbon atoms, an alkenyl group having 2 to 12 carbon atoms, an alkynyl group having 2 to 12 carbon atoms, an aryl group having 5 to 12 carbon atoms, a heteroaryl group having 5 to 12 carbon atoms, a halogen atom, or a hydrophilic substituent containing one or more atoms selected from the group consisting of boron, nitrogen, oxygen, phosphorus, sulfur, and halogen;
- n is 1;
- a and b are each independently an integer of 0 to 4.

Embodiment 2

A compound represented by the above formula (1) or a salt thereof,

- wherein $R^1$ is a substituted or unsubstituted alkyl group having 1 to 12 carbon atoms;
- $R^2$ and $R^3$ are each independently a substituted or unsubstituted alkyl group having 1 to 6 carbon atoms;
- $R^4$ and $R^5$ are each independently an alkyl group having 1 to 12 carbon atoms;
- n is 1;
- a and b are each independently an integer of 0 to 4.

Embodiment 3

A compound represented by the above formula (1) or a salt thereof,

- wherein $R^1$ is a substituted or unsubstituted alkyl group having 1 to 12 carbon atoms;
- $R^2$ and $R^3$ are each independently a substituted or unsubstituted alkyl group having 1 to 6 carbon atoms;
- $R^4$ and $R^5$ are each independently an aryl group having 5 to 12 carbon atoms;
- n is 1;
- a and b are each independently an integer of 0 to 4.

Embodiment 4

A compound represented by the above formula (1) or a salt thereof,

- wherein $R^1$ is a substituted or unsubstituted alkenyl group having 1 to 12 carbon atoms;
- $R^2$ and $R^3$ are each independently a substituted or unsubstituted alkyl group having 1 to 6 carbon atoms;
- $R^4$ and $R^5$ are each independently an alkyl group having 1 to 12 carbon atoms, an alkenyl group having 2 to 12 carbon atoms, an alkynyl group having 2 to 12 carbon atoms, an aryl group having 5 to 12 carbon atoms, a heteroaryl group having 5 to 12 carbon atoms, a halogen atom, or a hydrophilic substituent containing one or more atoms selected from the group consisting of boron, nitrogen, oxygen, phosphorus, sulfur, and halogen;

n is 1;

a and b are each independently an integer of 0 to 4.

Embodiment 5

A compound represented by the above formula (1) or a salt thereof, wherein $R^1$ is a substituted or unsubstituted alkenyl group having 1 to 12 carbon atoms;

$R^2$ and $R^3$ are each independently a substituted or unsubstituted alkyl group having 1 to 6 carbon atoms;

$R^4$ and $R^5$ are each independently an alkyl group having 1 to 12 carbon atoms;

n is 1;

a and b are each independently an integer of 0 to 4.

Embodiment 6

A compound represented by the above formula (1) or a salt thereof, wherein $R^1$ is a substituted or unsubstituted alkenyl group having 1 to 12 carbon atoms;

$R^2$ and $R^3$ are each independently a substituted or unsubstituted alkyl group having 1 to 6 carbon atoms;

$R^4$ and $R^5$ are each independently an aryl group having 5 to 12 carbon atoms;

n is 1;

a and b are each independently an integer of 0 to 4.

Embodiment 7

A compound represented by the above formula (1) or a salt thereof, wherein $R^1$ is a substituted or unsubstituted alkyl group having 1 to 12 carbon atoms;

$R^2$ and $R^3$ are each independently a substituted or unsubstituted alkyl group having 1 to 6 carbon atoms, and $R^2$ and $R^3$ form one ring structure together;

$R^4$ and $R^5$ are each independently an alkyl group having 1 to 12 carbon atoms, an alkenyl group having 2 to 12 carbon atoms, an alkynyl group having 2 to 12 carbon atoms, an aryl group having 5 to 12 carbon atoms, a heteroaryl group having 5 to 12 carbon atoms, a halogen atom, or a hydrophilic substituent containing one or more atoms selected from the group consisting of boron, nitrogen, oxygen, phosphorus, sulfur, and halogen;

n is 1;

a and b are each independently an integer of 0 to 4.

Embodiment 8

A compound represented by the above formula (1) or a salt thereof, wherein $R^1$ is a substituted or unsubstituted alkyl group having 1 to 12 carbon atoms;

$R^2$ and $R^3$ are each independently a substituted or unsubstituted alkyl group having 1 to 6 carbon atoms, and $R^2$ and $R^3$ form one ring structure together;

$R^4$ and $R^5$ are each independently an alkyl group having 1 to 12 carbon atoms;

n is 1;

a and b are each independently an integer of 0 to 4.

Embodiment 9

A compound represented by the above formula (1) or a salt thereof, wherein $R^1$ is a substituted or unsubstituted alkyl group having 1 to 12 carbon atoms;

$R^2$ and $R^3$ are each independently a substituted or unsubstituted alkyl group having 1 to 6 carbon atoms, and $R^2$ and $R^3$ form one ring structure together;

$R^4$ and $R^5$ are each independently an aryl group having 5 to 12 carbon atoms;

n is 1;

a and b are each independently an integer of 0 to 4.

Embodiment 10

A compound represented by the above formula (1) or a salt thereof, wherein $R^1$ is a substituted or unsubstituted alkenyl group having 1 to 12 carbon atoms;

$R^2$ and $R^3$ are each independently a substituted or unsubstituted alkyl group having 1 to 6 carbon atoms, and $R^2$ and $R^3$ form one ring structure together;

$R^4$ and $R^5$ are each independently an alkyl group having 1 to 12 carbon atoms, an alkenyl group having 2 to 12 carbon atoms, an alkynyl group having 2 to 12 carbon atoms, an aryl group having 5 to 12 carbon atoms, a heteroaryl group having 5 to 12 carbon atoms, a halogen atom, or a hydrophilic substituent containing one or more atoms selected from the group consisting of boron, nitrogen, oxygen, phosphorus, sulfur, and halogen;

n is 1;

a and b are each independently an integer of 0 to 4.

Embodiment 11

A compound represented by the above formula (1) or a salt thereof, wherein $R^1$ is a substituted or unsubstituted alkenyl group having 1 to 12 carbon atoms;

$R^2$ and $R^3$ are each independently a substituted or unsubstituted alkyl group having 1 to 6 carbon atoms, and $R^2$ and $R^3$ form one ring structure together;

$R^4$ and $R^5$ are each independently an alkyl group having 1 to 12 carbon atoms;

n is 1;

a and b are each independently an integer of 0 to 4.

Embodiment 12

A compound represented by the above formula (1) or a salt thereof, wherein $R^1$ is a substituted or unsubstituted alkenyl group having 1 to 12 carbon atoms;

$R^2$ and $R^3$ are each independently a substituted or unsubstituted alkyl group having 1 to 6 carbon atoms, and $R^2$ and $R^3$ form one ring structure together;

$R^4$ and $R^5$ are each independently an aryl group having 5 to 12 carbon atoms;

n is 1;

a and b are each independently an integer of 0 to 4.

Embodiment 13

A compound represented by the above formula (1) or a salt thereof, wherein $R^1$ is a substituted or unsubstituted alkyl group having 1 to 12 carbon atoms;

$R^2$ and $R^3$ are each independently a substituted or unsubstituted alkyl group having 1 to 6 carbon atoms, $R^2$ and $R^3$ form one ring structure together, and the ring structure is a piperidine ring;

$R^4$ and $R^5$ are each independently an alkyl group having 1 to 12 carbon atoms, an alkenyl group having 2 to 12 carbon atoms, an alkynyl group having 2 to 12 carbon atoms, an aryl group having 5 to 12 carbon atoms, a heteroaryl group having 5 to 12 carbon atoms, a halogen atom, or a hydrophilic substituent containing one or more atoms selected from the group consisting of boron, nitrogen, oxygen, phosphorus, sulfur, and halogen;

n is 1;

a and b are each independently an integer of 0 to 4.

Embodiment 14

A compound represented by the above formula (1) or a salt thereof, wherein $R^1$ is a substituted or unsubstituted alkyl group having 1 to 12 carbon atoms;

$R^2$ and $R^3$ are each independently a substituted or unsubstituted alkyl group having 1 to 6 carbon atoms, $R^2$ and $R^3$ form one ring structure together, and the ring structure is a piperidine ring;

$R^4$ and $R^5$ are each independently an alkyl group having 1 to 12 carbon atoms;

n is 1;

a and b are each independently an integer of 0 to 4.

Embodiment 15

A compound represented by the above formula (1) or a salt thereof, wherein $R^1$ is a substituted or unsubstituted alkyl group having 1 to 12 carbon atoms;

$R^2$ and $R^3$ are each independently a substituted or unsubstituted alkyl group having 1 to 6 carbon atoms, $R^2$ and $R^3$ form one ring structure together, and the ring structure is a piperidine ring;

$R^4$ and $R^5$ are each independently an aryl group having 5 to 12 carbon atoms;

n is 1;

a and b are each independently an integer of 0 to 4.

Embodiment 16

A compound represented by the above formula (1) or a salt thereof, wherein $R^1$ is a substituted or unsubstituted alkenyl group having 1 to 12 carbon atoms;

$R^2$ and $R^3$ are each independently a substituted or unsubstituted alkyl group having 1 to 6 carbon atoms, $R^2$ and $R^3$ form one ring structure together, and the ring structure is a piperidine ring;

$R^4$ and $R^5$ are each independently an alkyl group having 1 to 12 carbon atoms, an alkenyl group having 2 to 12 carbon atoms, an alkynyl group having 2 to 12 carbon atoms, an aryl group having 5 to 12 carbon atoms, a heteroaryl group having 5 to 12 carbon atoms, a halogen atom, or a hydrophilic substituent containing one or more atoms selected from the group consisting of boron, nitrogen, oxygen, phosphorus, sulfur, and halogen;

n is 1;

a and b are each independently an integer of 0 to 4.

Embodiment 17

A compound represented by the above formula (1) or a salt thereof, wherein $R^1$ is a substituted or unsubstituted alkenyl group having 1 to 12 carbon atoms;

$R^2$ and $R^3$ are each independently a substituted or unsubstituted alkyl group having 1 to 6 carbon atoms, $R^2$ and $R^3$ form one ring structure together, and the ring structure is a piperidine ring;

$R^4$ and $R^5$ are each independently an alkyl group having 1 to 12 carbon atoms;

n is 1;

a and b are each independently an integer of 0 to 4.

Embodiment 18

A compound represented by the above formula (1) or a salt thereof, wherein $R^1$ is a substituted or unsubstituted alkenyl group having 1 to 12 carbon atoms;

$R^2$ and $R^3$ are each independently a substituted or unsubstituted alkyl group having 1 to 6 carbon atoms, $R^2$ and $R^3$ form one ring structure together, and the ring structure is a piperidine ring;

$R^4$ and $R^5$ are each independently an aryl group having 5 to 12 carbon atoms;

n is 1;

a and b are each independently an integer of 0 to 4.

The absorption maximum wavelength of the compound described above is, for example, between 300 to 550 nm in a 20 mM phosphate buffer (pH 7.4) at 25 °C. The absorption maximum wavelength of the compound described above can be within a range between any two numerical values selected from the group consisting of, for example, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, and 550 nm.

When the fluorescence maximum wavelength of the compound described above in methanol at 25 °C is represented by $\lambda_{Met}$ and the fluorescence maximum wavelength in n-heptane at 25 °C is represented by $\lambda_{Hep}$, the difference between $\lambda_{Met}$ and $\lambda_{Hep}$ of the compound is, for example, 50 nm or more, 60 nm or more, 70 nm or more, 80 nm or more, 90 nm or more, 100 nm or more, or 110 nm or more. The larger the difference between $\lambda_{Met}$ and $\lambda_{Hep}$ is, the more easily the tumor tissue is detected with high contrast with respect to the healthy part tissue and the more preferable it is. The difference between $\lambda_{Met}$ and $\lambda_{Hep}$ of the compound can be 300 nm or less, 200 nm or less, or 150 nm or less.

The two-photon absorption maximum wavelength of the compound is preferably, for example, between 600 to 1200 nm in a 20 mM phosphate buffer (pH 7.4) at 25 °C. In particular, it is more preferable that the wavelength is longer than 900 nm. Such a compound is suitable for use in two-photon microscopy because the compound can be excited by light having such a wavelength that the light is not easily absorbed by biological substances in tissues.

The molecular weight of the compound described above may be, for example, 700 or less, 650 or less, 600 or less, or 500 or less. The lower limit may be 100 or more, 150 or more, or the like.

Salt and so on of Compound

The salt of the compound of the present invention refers to a material in which a part or the whole of the compound is in the form of a salt. Examples thereof include a form in which the amino group moiety of the compound forms an ammonium cation, which forms a salt together with a halogen ion, an organic anion, an inorganic anion, or the like as a counter anion. For example, the compound of the present invention may form a salt as a zwitterion having both a cation and an anion in the same molecule.

In addition, in the present invention, the compound also includes a derivative generated through a chemical change of a small moiety in the molecule, and includes a simple structurally substituted body, an adduct, a hydrate, and so on, and also includes a compound called an analogue.

Method for Producing Compound

The compound of the present invention can be produced by appropriately using a publicly known method.

For example, in the case of the following compound A, the compound A can be synthesized as in the following scheme.

[Formula 3]

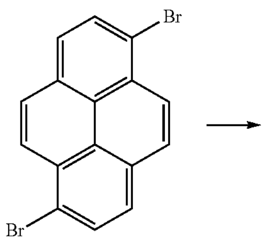

1, 6-dibromopyrene

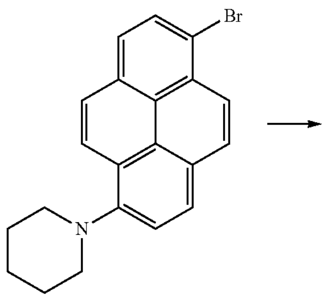

2

-continued

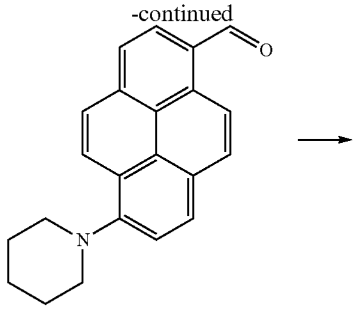

1

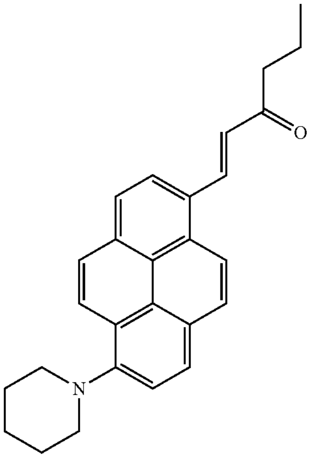

A

Examples of the synthesis of the compound A include a method in which one bromo group of 1,6-dibromopyrene is first replaced by a piperidinyl group using piperidine (compound 2 indicated above), then the other bromo group is converted to a formyl group using N,N-dimethylformamide (compound 1 indicated above) (see, for example, Y. Nikko et al, Sci, Rep., 2016), and thereafter the compound 2 is converted into an enone structure under alkaline conditions using 2-pentanone.

Fluorescent Dye

The fluorescent dye of the present invention comprises the compound described above or a salt thereof.

By using the fluorescent dye of the present invention, cells and the like can be easily and quickly stained.

The fluorescent dye is used, for example, for detecting cells (for example, tumor cells and the like) in a tissue derived from a living body.

The fluorescent dye is used, for example, for morphological detection of cells.

The fluorescent dye is used, for example, for staining or visualization of a biological sample.

The fluorescent dye is used, for example, for fluorescence imaging.

The tissue or the cell to which the fluorescent dye of the present invention is applied are not particularly limited, and may be those derived from a living body, artificially synthesized, or cultured, for example, regardless of animals, plants, living cells, dead cells, and the like.

The living body is not particularly limited as long as the living body is a multicellular animal, and is preferably a mammal, and more preferably a human.

Examples of the tissue include skin, brain, spinal cord, esophagus, stomach, small intestine, large intestine, duodenum, rectum, liver, pancreas, gallbladder, bladder, kidney, heart, spleen, thymus, prostate, uterus, ovary, testis, breast, lungs, bronchus, eyeball, nose, sinus cavity, oral cavity, pharynx, salivary gland, thyroid gland, parathyroid gland, adrenal gland, muscle, bone marrow, blood vessel, nerve, lymph node, peritoneum, diaphragm, and blood. In one embodiment, the tissue to which the fluorescent dye of the present invention is to be applied is the skin, for example, epidermis or dermis, or a combination of both.

The fluorescent dye of the present invention can be applied to, for example, a tissue separated from a living body by a surgical treatment such as extraction, excision, puncture, or blood collection, or a tissue obtained from feces, urine, sweat, other body fluids, or the like.

In the present description, the tissue derived from a living body includes, in addition to a tissue separated from the living body, the living body itself, a tissue that is a part of the living body and is not separated from the living body, or the like.

In one embodiment, the form of the tissue may be appropriately selected according to the detection method, and may be, for example, an organ itself, or a thin sliced section or a three-dimensional fragment thereof.

Depending on the form, the tissue or the like may be subjected to treatment such as fixation with formalin or the like, paraffin embedding, deparaffinization, dehydration, and clearing treatment.

The tumor cells to be detected by the fluorescent dye of the present invention may be either benign or malignant (such as cells of cancer and sarcoma), but are preferably malignant tumor cells. The type of the tumor cells is also not particularly limited, and examples thereof include cells of a tumor generated in the above tissue.

In one embodiment, the tumor cells are cells derived from a tumor of the skin. Examples of such tumor cells include cells of sweat gland tumors (extramammary Paget's disease, mammary Paget's disease, eccrine porocarcinoma, microcystic adnexal carcinoma, mucinous carcinoma of skin, and the like), malignant melanomas, epidermal and hair follicle tumors (basal cell carcinoma, squamous cell carcinoma, actinic keratosis, Bowen's disease, leukoplakia, keratoacanthoma, and the like), nervous system tumors (Merkel cell carcinoma, malignant peripheral nerve sheath tumor, and the like), and mesenchymal tumors (dermatofibrosarcoma protuberans, isolated fibrotic tumor, muscle tumor, liposarcoma, angiosarcoma, Kaposi's sarcoma, spindle cell hemangioendothelioma, heterogeneous fibroxanthoma, epithelioid sarcoma, synovial sarcoma, undifferentiated pleomorphic cell sarcoma, and the like). In ca particular embodiment, the tumor cells are extra-mammary Paget disease-derived cells (Paget cells) or malignant melanoma cells.

In the fluorescent dye of the present invention, the compound is not particularly limited as long as the compound is applicable to a tissue or the like.

In one embodiment, the SC compound can be distributed in a cell membrane, inside a cell, and in secretion, and in a more particular embodiment, the compound can be inserted into a cell membrane.

Examples of the secretion include bile, hormones, digestive enzymes, exosomes, amyloid, and insulin.

In one embodiment, the compound exhibits strong fluorescence anisotropy in a cell membrane.

In one embodiment, the compound has a property of having a lower fluorescence intensity outside a cell as compared to a cell membrane and/or inside a cell. In a particular embodiment, substantially no fluorescence is observed outside a cell from the compound. Without particular limitation, for example, the fluorescence intensity of the compound outside a cell can be 50% or less, 40% or less, 30% or less, 20% or less, 10% or less, 5% or less, or 1% or less of the fluorescence intensity inside a cell. The comparison of the fluorescence intensities inside a cell and outside a cell is performed by exciting a cell derived from a tissue of an object of the present invention with light having such a wavelength that the compound can be excited by the light, acquiring a fluorescence microscope image under a condition under which light having a fluorescence maximum wavelength can be detected, and comparing average signal intensities of fluorescence inside the cell and fluorescence outside the cell.

The fluorescent dye of the present invention may be used singly, or two or more types thereof may be used in combination.

In the fluorescent dye of the present invention, in addition to the compound described above or a salt thereof, other components and the like to be used in publicly known fluorescent dyes may be appropriately combined and used.

The fluorescent dye may further comprise, for example, any one alone or a combination of two or more of a pH buffer, a surfactant, a salt, a solvent, a dye composition different from the compound (1), and the like as the above-mentioned other components.

Examples of the pH buffer include one alone or a combination of two or more selected from the group consisting of tris(hydroxymethyl)aminomethane; Good's buffers (HEPES, MOPS and the like); and a pH buffer containing citric acid, acetic acid, lactic acid, oxalic acid, phthalic acid, imidazole, triethanolamine, diethanolamine, glycine, boric acid, phosphoric acid, or carbonic acid.

Examples of the solvent include one alone or a combination of two or more selected from the group consisting of water, ethanol, methanol, 2-propanol, dimethyl sulfoxide, N,N-dimethylformamide, acetonitrile, acetone, ethyl acetate, tetrahydrofuran, and 1,2-dichloroethane.

The dye composition different from the compound (1) is not particularly limited as long as the dye composition does not interfere with the detection of cells by the compound (1). For example, nuclear staining dyes such as propidium iodide (PI), ethidium bromide, acridine orange, DAPI, and Hoechst hardly disturb staining of the above compound, and can be suitably used. Examples of the dye composition different from the compound (1) that can be used include dye compositions to be used for various types of tissue staining, such as hematoxylin/eosin (HE) staining, azan staining, Masson's trichrome staining, elastica/Wangeson staining, silver plating staining, Victoria blue staining, PAM staining, PTAH staining, Sudan III staining, oil red O staining, PAS staining, alcian blue staining, toluidine blue staining, colloidal iron staining, mucicarmine staining, Congo red staining, Dylon staining, Grimelius staining, Fontana Masson staining, Kossa staining, Berlin blue staining, Bodian staining, Kluber/Valera staining, and Giemsa staining. These different dye compositions can be used singly or in combination of two or more types thereof.

The fluorescent dye of the present invention may be either a solid such as a powder or a liquid.

When a tissue is stained with the fluorescent dye of the present invention, for example, the compound (1) may be distributed at every site of the intracellular lipid membrane, but the fluorescence wavelength shifts depending on the phase (composition) of the lipid membrane, and a change in fluorescence color occurs. Thus, by appropriately selecting the wavelength of fluorescence to be detected, for example, a change of the phase of the intracellular lipid membrane is detected with high contrast.

When a tissue is stained with the fluorescent dye of the present invention, the compound (1) can be distributed, for example, in both tumor cells and cells of normal tissues, and the fluorescence wavelength of the compound (1) in the tumor cells shifts from the fluorescence wavelength in cells of normal tissues. Thus, by appropriately selecting the wavelength of fluorescence to be detected, tumor cells are detected with high contrast relative to normal tissues. The fluorescent dye of the present invention can be used for inspection or diagnosis of a tumor, particularly a malignant tumor.

When the fluorescent dye of the present invention is applied to a living body, the fluorescent dye can be used, for example, for diagnosis of a tumor, particularly a malignant tumor. Further, in order to specify the removal area of a tumor, particularly a cancer, of a living body or in order to confirm whether a tumor remains unremoved, the fluorescent dye of the present invention may be applied to a living body before, at the time of, or after the removal treatment.

Kit

The kit of the present invention includes the compound described above or a salt thereof.

By using the kit of the present invention, cells and the like can be easily and quickly stained.

For the configuration included in the kit, for example, the description in the section of the fluorescent dye can be appropriately similarly adopted.

The kit may be one prepared, for example, by combining a reagent or an instrument for staining or producing a tissue specimen with the compound described above or a salt thereof.

In one embodiment, the kit includes a reagent for dye preparation. In a further particular embodiment, the reagent for dye preparation can contain, for example, one alone or a mixture of two or more selected from the group consisting of the pH buffers described above, a surfactant, a salt, a solvent, and another dye composition.

Method for Detecting Cells

The method for detecting cells of the present invention includes step (1) of staining a cell with a fluorescent dye comprising the compound described above or a salt thereof.

By using the method for detecting cells of the present invention, cells and the like can be easily detected.

As the fluorescent dye in the step (1), the above-described fluorescent dye can be appropriately similarly employed.

In addition, the description of each constituent in the section of the fluorescent dye described above and the like can be appropriately similarly adopted.

In the step of staining a cell in the step (1), materials, techniques, and the like used in publicly known cell staining steps can be appropriately used.

The method for detecting cells of the present invention can include, after the step (1), step (2) of performing evaluation using fluorescence spectra measured in two or more solvents, respectively.

Since the fluorescent dye of the present invention may be the above-described compound that exhibits solvatochromism, the absorption maximum wavelength or the fluorescence maximum wavelength or both thereof change depending on the change in polarity (hydrophobicity) around the compound or the fluorescent dye. In the step (2), since the step of using such a fluorescent dye is adopted, it is possible to easily perform, for example, evaluation, such as morphological detection of cells or staining or visualization of a biological sample, using fluorescence spectra measured in two or more solvents, respectively.

In the step of performing evaluation using fluorescence spectra in the step (2), a method of measuring the fluorescence spectrum of a substance such as a publicly known compound, tissue or the like can be appropriately used.

Examples of the solvent that can be used in the step (2) include one alone or a combination of two or more selected from the group consisting of water, ethanol, methanol, 2-propanol, dimethyl sulfoxide (DMSO), N,N-dimethylformamide, acetonitrile, acetone, ethyl acetate, tetrahydrofuran, and 1,2-dichloroethane.

In addition, the step (2) is preferably performed using, for example, fluorescence imaging. For example, two-photon fluorescence imaging can also be suitably used.

In one embodiment, the method of the present invention is applied to a tissue that is an organ itself or a three-dimensional fragment thereof. In this embodiment, the step of clearing the tissue before staining is preferably included. Examples of the tissue clearing method include TDE method, LUCID method, CLARITY method, PACT/PARS method, CUBIC method, 3DISCO method, Scale method, ScaleS method, SeeDB method, FocusClear method, Clear method, BABB method, iDISCO method, and uDISCO method. These clearing methods are described, for example, in Cell Chem. Biol. 2016, Vol. 23, 137-157, Laser Photonics Rev. 2019, Vol. 13, 1800292.

In one embodiment, the method of the present invention is applied to a living body itself or a part of a living body that is not separated from the living body.

As one embodiment, the method of the present invention is applied to a thin sliced section. The thin sliced section can optionally be subjected to treatments such as fixation, dehydration, dealcoholization, paraffin penetration, paraffin embedding, deparaffinization, immersion, and staining using the various tissue staining methods described above that are usually used in clinical examinations.

The staining is usually performed by bringing a dye including the compound described above into contact with a tissue or the like. The concentration of the compound in the dye is adjusted to, for example, 0.001 mg/mL or more, 0.01 mg/mL or more, 0.1 mg/mL or more, 0.2 mg/mL or more, 0.3 mg/mL or more, 0.4 mg/mL or more, 0.5 mg/mL or more, 0.6 mg/mL or more, 0.7 mg/mL or more, 0.8 mg/mL or more, 0.9 mg/mL or more, or 1 mg/mL or more with respect to the total amount of the dye.

The concentration of the compound in the dye is adjusted to, for example, 500 mg/mL or less, 200 mg/mL or less, 100 mg/mL or less, 50 mg/mL or less, 20 mg/mL or less, 10 mg/mL or less, 5 mg/mL or less, or 2 mg/mL or less with respect to the total amount of the dye.

The temperature at the time of staining is not particularly limited, and is, for example, 0 to 80 °C, 4 to 50 °C, 20 to 45 °C, or 25 to 40 °C, and preferably 35 °C to 42 °C.

The time for bringing a dye into contact with a tissue or the like is, for example, 1 minute or more, 10 minutes or more, 20 minutes or more, 1 hour or more, 2 hours or more, 1 day or more, or 2 days or more, and is, for example, 14 days or less or 7 days or less.

In one embodiment, the time for bringing a dye into contact with a tissue or the like is, for example, 12 hours or less or 6 hours or less, preferably 2 hours or less, more preferably 1 hour or less, still more preferably 30 minutes or less, and still more preferably 10 minutes or less at 0 to 40 °C, and can be, for example, 1 minute or more, 2 minutes or more, 5 minutes or more, or 10 minutes or more.

The tissue or the like stained with a dye including the compound described above can be used as it is for morphological detection of cells, detection of tumor cells, or the like, but can optionally be subjected to a treatment such as staining with another dye composition before detection.

The method of the present invention can further include the step of detecting tumor cells. The detection of tumor cells is performed, for example, by exciting the compound described above with light of an appropriate wavelength and detecting emitted fluorescence. For the detection, for example, a confocal laser scanning microscope can be used, and a microscope capable of multiphoton excitation such as a two-photon microscope is used depending on the thickness of the section. For example, use of 1-acetyl-6-piperidylpyrene (PK) as the compound described above is suitable for measurement with a two-photon microscope as described in Examples.

In one embodiment, cells including tumor cells are detected by selecting fluorescence including one specific wavelength such that a contrast is obtained between tumor cells and cells of a normal tissue and measuring the fluorescence intensity thereof.

In another embodiment, the detection of cells including tumor cells is performed by multi-wavelength measurement. That is, cells are detected by detecting fluorescence including two or more different specific wavelengths and integrating the respective fluorescence intensities.

As one embodiment, when the compound A in Examples is used as the compound described above, the fluorescence to be detected includes one wavelength or two or more wavelengths selected from, for example, a range of 350 to 750 nm, a range of 550 nm to 700 nm, a range of 600 nm to 700 nm, or a range of 650 to 750 nm.

Using the method of detection of the present invention, as described in the section of [Fluorescent dye] above, inspection or diagnosis of cells of a tumor or the like, or specification of a tumor removal area can be performed.

In addition to merging, ratiometric analysis (a method involving detecting fluorescences of two different wavelengths and calculating a ratio of their fluorescence intensities) is also effective as image analysis utilizing solvatochromism.

In addition to the fluorescence imaging, fluorescence lifetime imaging and so on can also be used as appropriate.

EXAMPLES

Next, the present invention will be specifically described with reference to Examples, but the present invention is not limited to the following Examples.

Example 1

Synthesis of Compound A

The synthesis of the compound A was performed as in the following scheme.

[Formula 4]

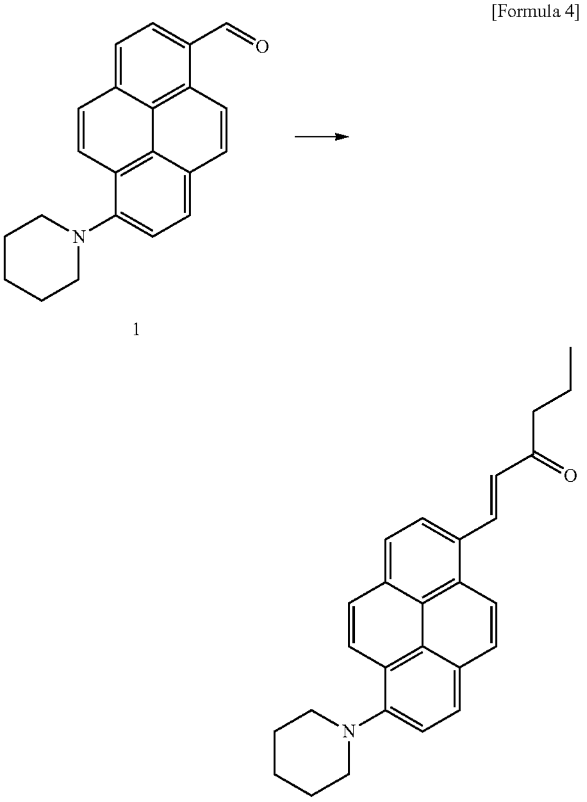

1

A

A 1 M aqueous sodium hydroxide solution (1 mL) and dehydrated ethanol (6 mL) were added to compound 1 which is a known pyrene derivative (100 mg, 0.32 mmol) and 2-pentanone (47 μL, 0.48 mmol), and the obtained solution was heated and stirred at 60 °C for 4 hours under an argon atmosphere.

Then, water was added to the solution, and the resulting precipitate was collected by filtration.

The obtained precipitate was purified by silica gel column chromatography (dichloromethane:hexane=2:1), and further recrystallized with acetonitrile, affording a target compound A (PC). (yield amount: 20 mg, yield percent: 16%)

Figure 2:
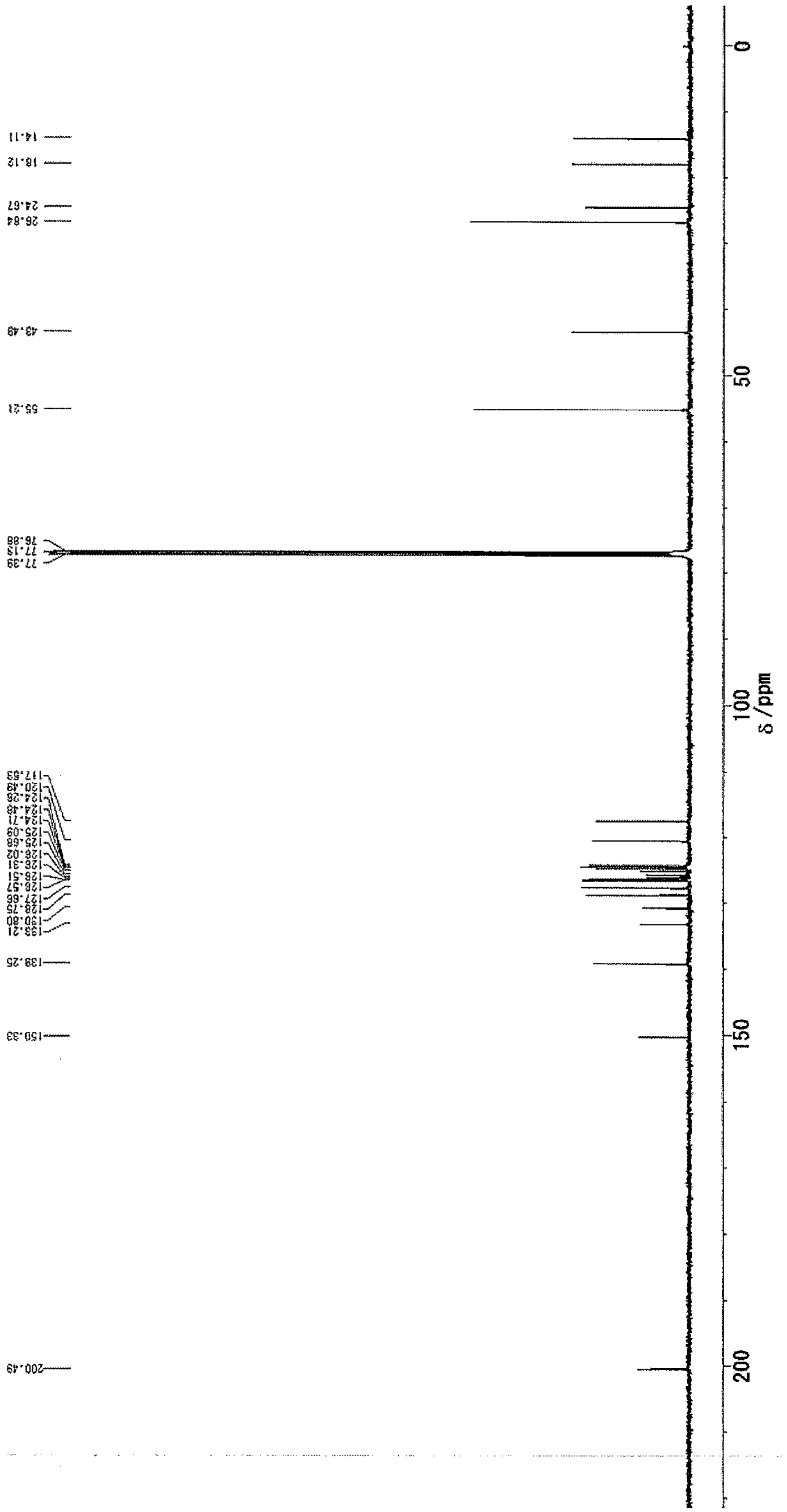
FIG. 2 is a chart of $^{13}$C NMR spectrum measurement of the compound A in an Example.

$^{1}H$-NMR Analysis and $^{13}C$-NMR Analysis $^{1}H$-NMR analysis and $^{13}C$-NMR analysis were performed using a nuclear magnetic resonance apparatus (JNM-LA 500 manufactured by JEOL Ltd.). The results obtained in the compound A are shown below and in FIGS. 1 and 2.

$^{1}H$ NMR (500 MHZ, $CDCl_3$): δ (ppm)=8.71 (d, J=15.6 Hz, 1H), 8.46 (d, J=9.2 Hz, 1H), 8.33 (d, J=9.2 Hz, 1H), 8.25 (d, J=9.2 Hz, 1H), 8.15 (d, J=8.1 Hz, 1H), 8.09 (d, J=8.1 Hz, 1H), 8.08 (d, J=9.2 Hz, 1H), 8.03 (d, J=9.2 Hz, 1H), 7.74 (d, J=8.1 Hz, 1H), 7.01 (d, J=15.6 Hz, 1H), 3.22 (s, 4H), 2.78 (t, J=7.4 Hz, 2H), 1.93-1.95 (m, 4H), 1.77-1.85 (m, 2H), 1.73 (s, 2H), 1.06 (t, J=7.33 Hz, 1H).

$^{13}C$ NMR ($CDCl_3$, TMS) δ (ppm)=14.11, 18.12, 24.67, 26.84, 43.49, 55.21, 117.53, 120.49, 124.26, 124.48, 124.71, 125.09, 125.68, 126.02, 126.31, 126.51, 126.57, 127.66, 128.75, 130.80, 133.21, 139.25, 150.33, 200.49.

High-Resolution Mass Spectrometry

The high-resolution mass spectrometry was performed using a high-resolution mass spectrometer (JMS-700 manufactured by JEOL Ltd.). The results obtained with the compound A are shown below.

HRMS ($ESI^+$), calcd for $C_{25}H_{23}NO$ $[M+Na]^+$404.1985, found 404.1981.

Example 2

Measurement of Photophysical Properties of Compound A in Organic Solvent

The absorption spectrum and fluorescence spectrum in organic solvents of the compound A obtained in Example 1 were measured.

Figure 3:
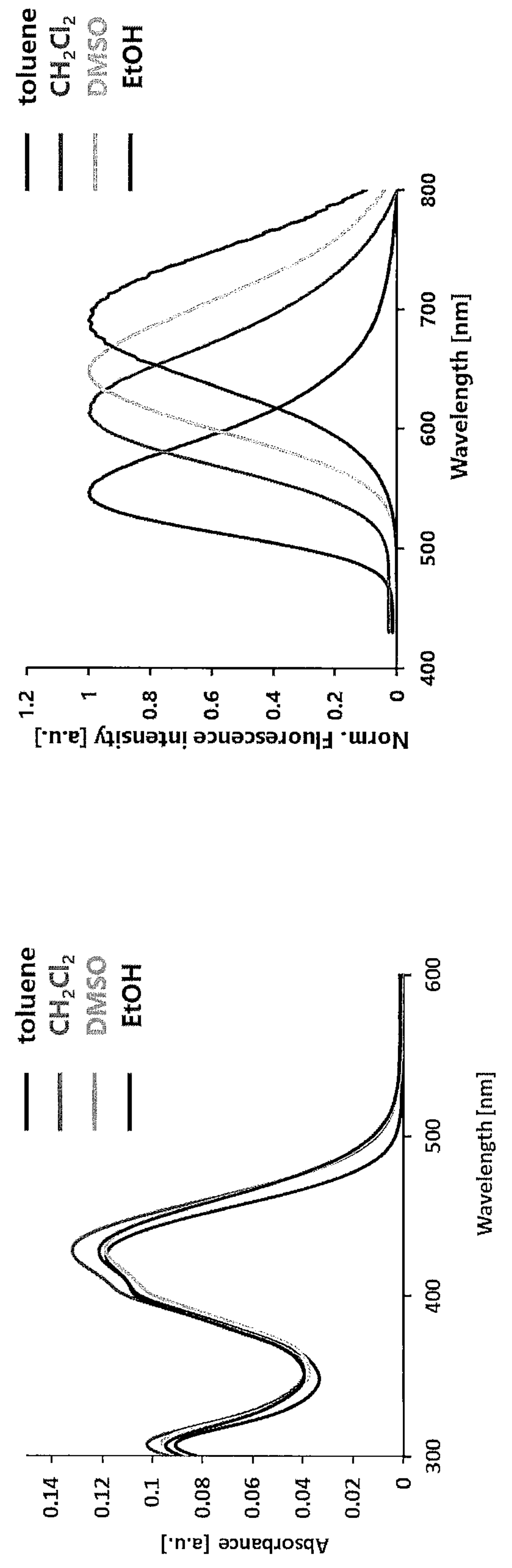
FIG. 3 includes a chart (left) of absorption spectrum measurement and a chart (right) of fluorescence spectrum measurement (normalized) of the compound A in an organic solvent in an Example.

The absorption spectrum and the fluorescence spectrum were measured using a UV-Visible/NIR spectrophotometer (V-670 manufactured by JASCO Corporation) and a spectrofluorometer (FP6600 manufactured by JASCO Corporation), respectively. The fluorescence quantum yield was measured using an absolute PL quantum yield spectrometer (Hamamatsu Photonics K.K.: C 9920-02V). The concentration of the compound A was 5 μM for each solvent. For solvent species, toluene, dichloromethane, DMSO, and ethanol were used. The results obtained are shown in FIG. 3 and Table 1.

TABLE 1

Maximum absorption wavelength, fluorescence wavelength, and fluorescence quantum yield of compound A in organic solvents

| Solvent | Maximum absorption wavelength (nm) | Maximum fluorescence wavelength (nm) | Fluorescence quantum yield (%) |
|---|---|---|---|
| Toluene | 424 | 546 | 82 |
| DCM | 427 | 615 | 86 |
| DMSO | 429 | 647 | 79 |
| EtOH | 427 | 691 | 20 |

As shown in FIG. 3 and Table 1, the maximum absorption wavelengths were almost the same value irrespective of the solvent species, but the maximum fluorescence wavelengths were different depending on the solvent species. More specifically, in polar solvents, an increase in the fluorescence wavelength was observed, and fluorescence solvatochromism sensitive to solvent polarity was observed in polar solvents.

Example 3

Evaluation of Light Stability of Compound A

The light stability of the compound A obtained in Example 1 was evaluated.

The light stability of the compound A and that of a commercially available solvatochromic dye Laurdan were compared (solvent: toluene; each dye concentration: 5 μM; excitation wavelength: 378 nm; detection wavelength: 483 nm). Laurdan is a compound with a CAS number of 74515-25-6. The fluorescence spectrum measurement was carried out using the same instrument as that used in Example 2. The results obtained are shown in FIG. 4.

Figure 4:
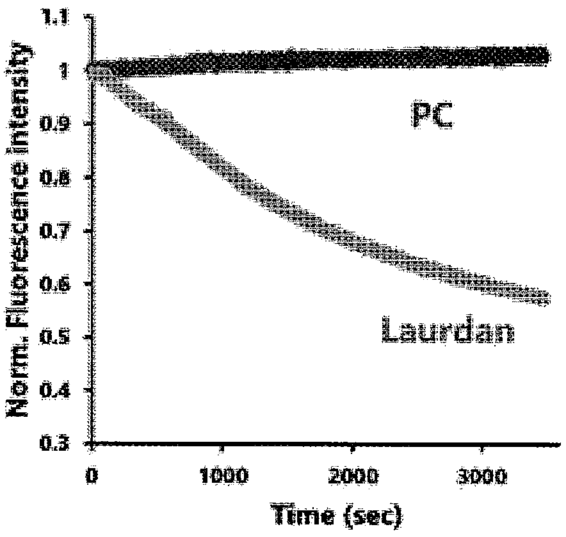
FIG. 4 is a diagram of the comparison of light stability between the compound A and Laurdan in an Example.

As shown in FIG. 4, in the case of using the known Laurdan, a decrease in fluorescence intensity was observed with the lapse of time, and for example, a significant decrease to 0.6 or less was observed at 3000 seconds after excitation by UV irradiation. On the other hand, when the compound A was used, for example, the fluorescence intensity was maintained as it was even after 3000 seconds had elapsed after excitation by UV irradiation.

Example 4

Fluorescence Spectrum Measurement of Compound A in Lipid Membrane

Figure 5:
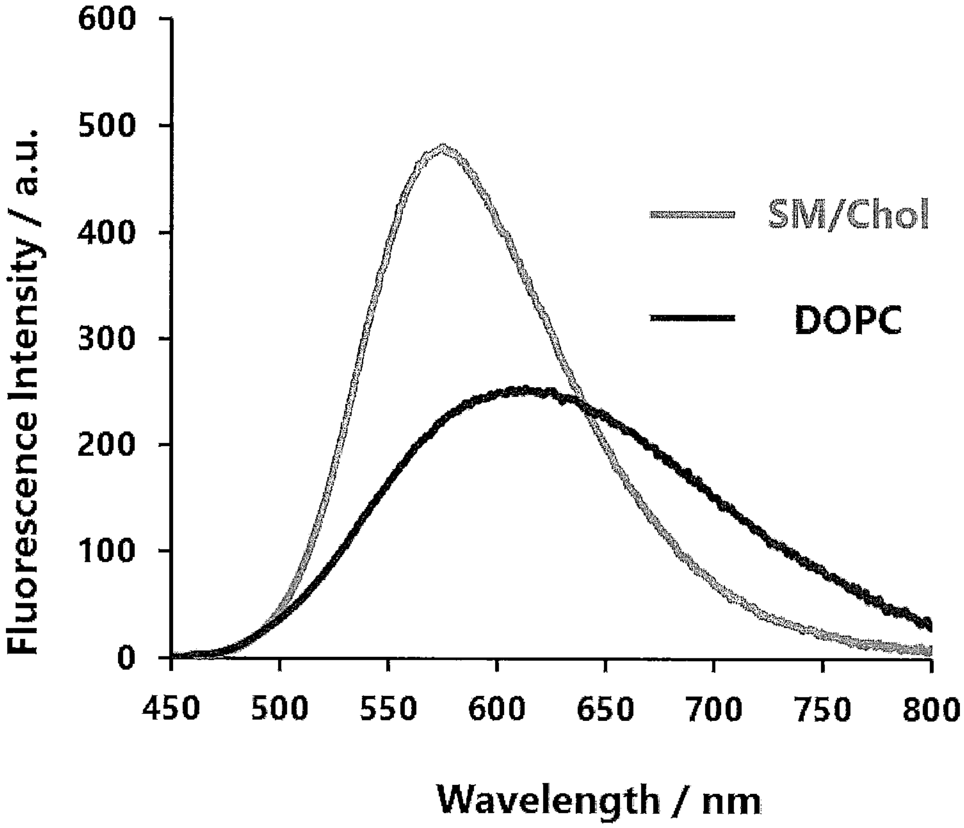
FIG. 5 is a chart of the fluorescence spectrum measurement of the compound A in a liposome composed of 1,2-dioleoyl-sn-glycero-3-phosphocholine (DOPC) and sphingomyelin (SM)/cholesterol (Chol).

The fluorescence spectrum of the compound A obtained in Example 1 in a lipid membrane (liposome) was measured. More specifically, the fluorescence spectrum of the compound A in a liposome composed of 1,2-dioleoyl-sn-glycero-3-phosphocholine (DOPC) and sphingomyelin (SM)/cholesterol (Chol) was measured (compound A concentration: 2 μM, lipid concentration: 200 μM). The fluorescence spectrum measurement was carried out using the same instrument as that used in Example 2. The results obtained are shown in FIG. 5 and Table 2.

TABLE 2

Maximum fluorescence wavelength and fluorescence quantum yield of compound A in liposome

| Liposome lipid composition | Maximum fluorescence wavelength (nm) | Fluorescence quantum yield (%) |
|---|---|---|
| SM/Chol | 577 | 72 |
| DOPC | 603 | 37 |

As shown in FIG. 5 and Table 2, a wavelength change was observed in the maximum fluorescence wavelength due to the difference in the lipid composition. More specifically, a longer wavelength of the fluorescence wavelength was observed in a liposome composed of a highly polar lipid and containing many water molecules in the membrane.

Example 5

Fluorescence Imaging of Cells Using Compound A

Fluorescence imaging of cells was performed using the compound A obtained in Example 1. More specifically, confocal fluorescence imaging of human prostate cancer cells (PC3) stained with the compound A of the Example was performed (compound A concentration: 500 nM; excitation wavelength: 405 nm).

For microscopic observation, a confocal scanning laser microscope (manufactured by Olympus Corporation, FV1000-D) was used. In the measurement, fluorescence was detected in a green (490-590 nm) channel and a red (655-755 nm) channel using a 405 nm laser light source.

As the human prostate cancer cells used for the observation, cultured cells were used. The compound A (500 nM) was added to the cultured cells, and the mixture was allowed to stand at room temperature for 30 minutes, and then imaging was performed.

Figure 6:
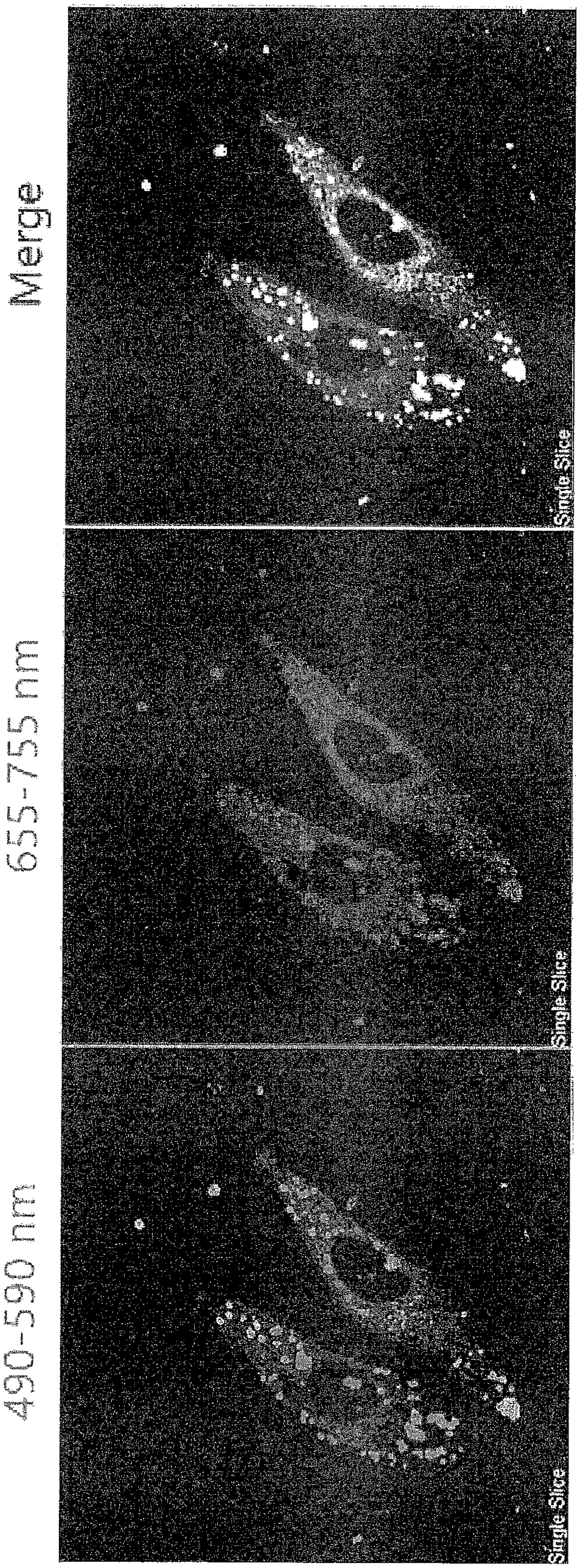
FIG. 6 is a confocal fluorescence imaging image of a human prostate cancer cells (PC3) stained with the compound A in an Example.

The results obtained are shown in FIG. 6.

As shown in FIG. 6, there was a difference in the detected fluorescence intensity between the green and red channels depending on the location in cells. More specifically, in a cell membrane (plasma membrane) in which saturated phospholipid and cholesterol, which are considered to have low polarity and hydration degree, are abundantly present, and in oil droplets (lipid droplet) in which triglyceride and cholesterol ester are abundantly present, strong fluorescence was observed in the green channel. In a merged image, similarly, it was recognized that the green hue was strong in the cell membrane and the oil droplets, and the red hue was strong in the intracellular membrane.

Example 6

Toxicity Evaluation of Compound A

The toxicity of fluorescence imaging of cells using the compound A obtained in Example 1 was evaluated. More specifically, the toxicity evaluation (MTT test) of the compound A to human keratinocyte K16 (P4) was performed.

As a toxicity evaluation procedure, first, a medium containing the compound A at a maximum concentration of 100 μM (maximum DMSO concentration=0.5% v/v) was added to cells to prepare a 2-fold dilution series. After 24 hours, the medium was discarded and an MTT reagent (5 g/mL) was added. After 3 hours, a 10% SDS reagent was added to the cells, and the absorbance at 570 nm was measured the next day.

Figure 7:
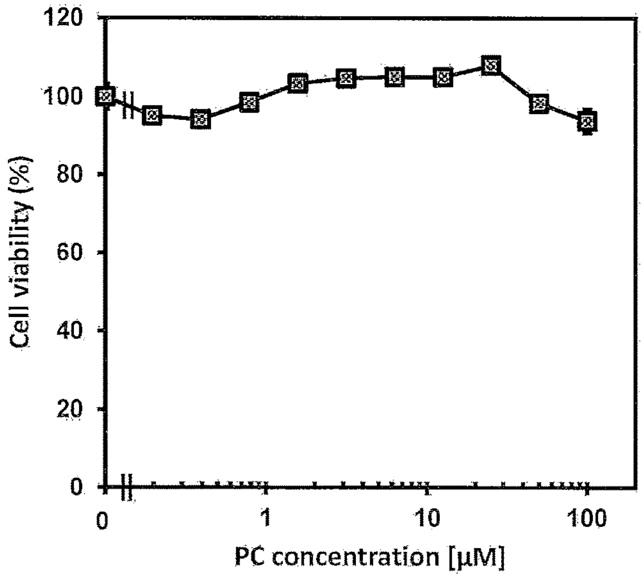
FIG. 7 is a graph of the toxicity evaluation (MTT test) of the compound A to human keratinocyte K16 (P4).

The results obtained are shown in FIG. 7.

As shown in FIG. 7, almost no cytotoxicity was observed even when the concentration of the compound A was 100 μM (cell viability: 93.9%). The cell viability with 0.5% DMSO alone was 87.3%.

Example 7

Human Skin Tissue Imaging Using Compound A

Human skin tissue (frozen tissue) imaging was performed using the compound A obtained in Example 1. More specifically, two-photon fluorescence imaging of human skin tissues (frozen tissues) stained with the compound A of the Example was performed (compound A concentration: 10 μM, excitation wavelength: 960 nm; a clearing reagent (LUCID) was used in combination.).

For microscopy, a two-photon microscope A1R MP+ (NIKON) was used. In the measurement, 960 nm was used as a laser light source for excitation for the compound A. Scanning was performed to a depth of 100 μm of the sample. The three-dimensional reconstructed image is obtained by processing the obtained data with attached software.

Human skin tissues were embedded in paraffin and then cut out to prepare tissue sections. The preparation of the sections (thickness: 5 μm) was performed by the procedure usually performed in histopathological examination. For staining with the compound A dye, deparaffinization was performed by a conventional method, and then staining was performed by immersion in the aforementioned dye at room temperature for several days to one week. In practice, the tissues were sufficiently stained by immersion in the dye at room temperature for 2 to 3 days.

Figure 8:
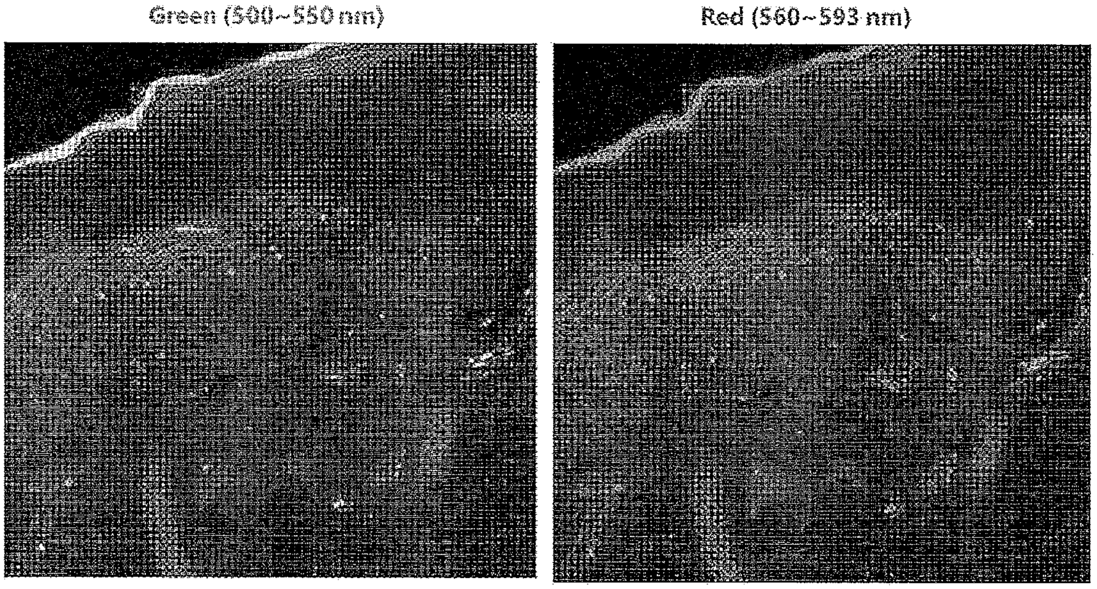
FIG. 8 is a two-photon fluorescence imaging image of a human skin tissue (frozen tissue) stained with the compound A.

The obtained results are shown in FIG. 8.

As shown in FIG. 8, it was recognized that the compound A was capable of strongly staining the membrane of each cell constituting the human skin tissue by being used in combination with a clearing reagent, distinguishing the boundaries of individual cells, and clearly delineating the tissue structure. More specifically, it is superior especially in delineation of the horny layer structure, the clear layer, the keratinocyte bridge in the stratum spinosum, and the Acrosyringium structure.

Example 8

Synthesis of Compound B

The synthesis of the compound B was performed as in the following scheme.

[Formula 5]

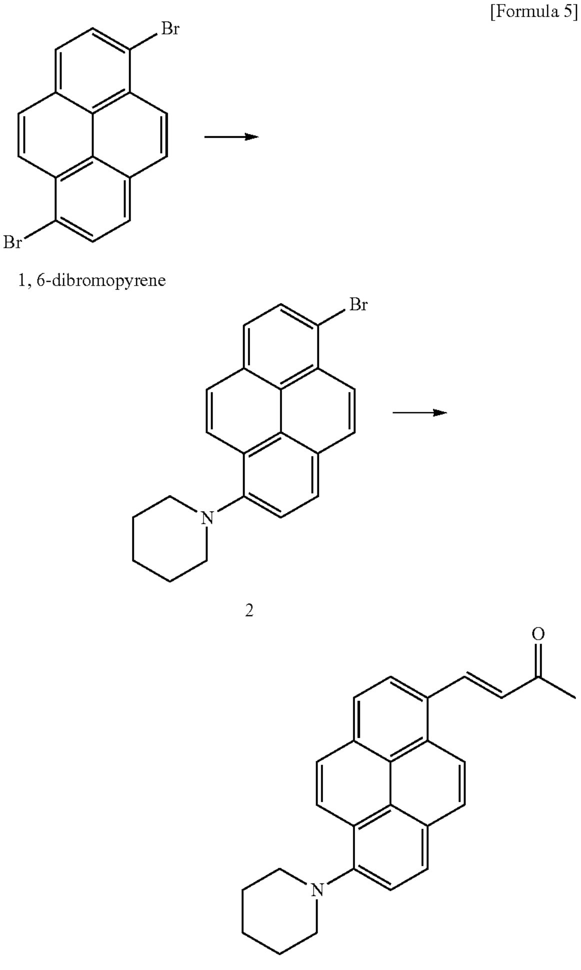

1, 6-dibromopyrene

2

B

To a mixture of known compound 2 (200 mg, 0.54 mmol), tris(dibenzylideneacetone)dipalladium(0) (3 mg, 0.003 mmol), cataCXium (registered trademark) PtB (3.2 mg, 0.01 mmol), tetrabutylammonium chloride (150 mg, 0.54 mmol), and sodium hydrogen carbonate (113 mg, 1.35 mmol) were added 3 mL of dehydrated DMF and methyl vinyl ketone (66 μL, 0.81 mmol), and the resulting solution was stirred under reflux for 12 hours under an argon atmosphere.

The resulting solution was returned to room temperature, the formed precipitate was filtered off, and dichloromethane was added to the filtrate. The organic layer was washed with water and brine. Magnesium sulfate was added to the solution and the solution was dried, and then the magnesium sulfate was filtered off and the organic solvent was removed with an evaporator.

The residue obtained as described above was purified by silica gel column chromatography (dichloromethane), and further recrystallized from acetonitrile, affording a target compound B. (yield amount: 23 mg, yield percent: 12%)

Figure 9:
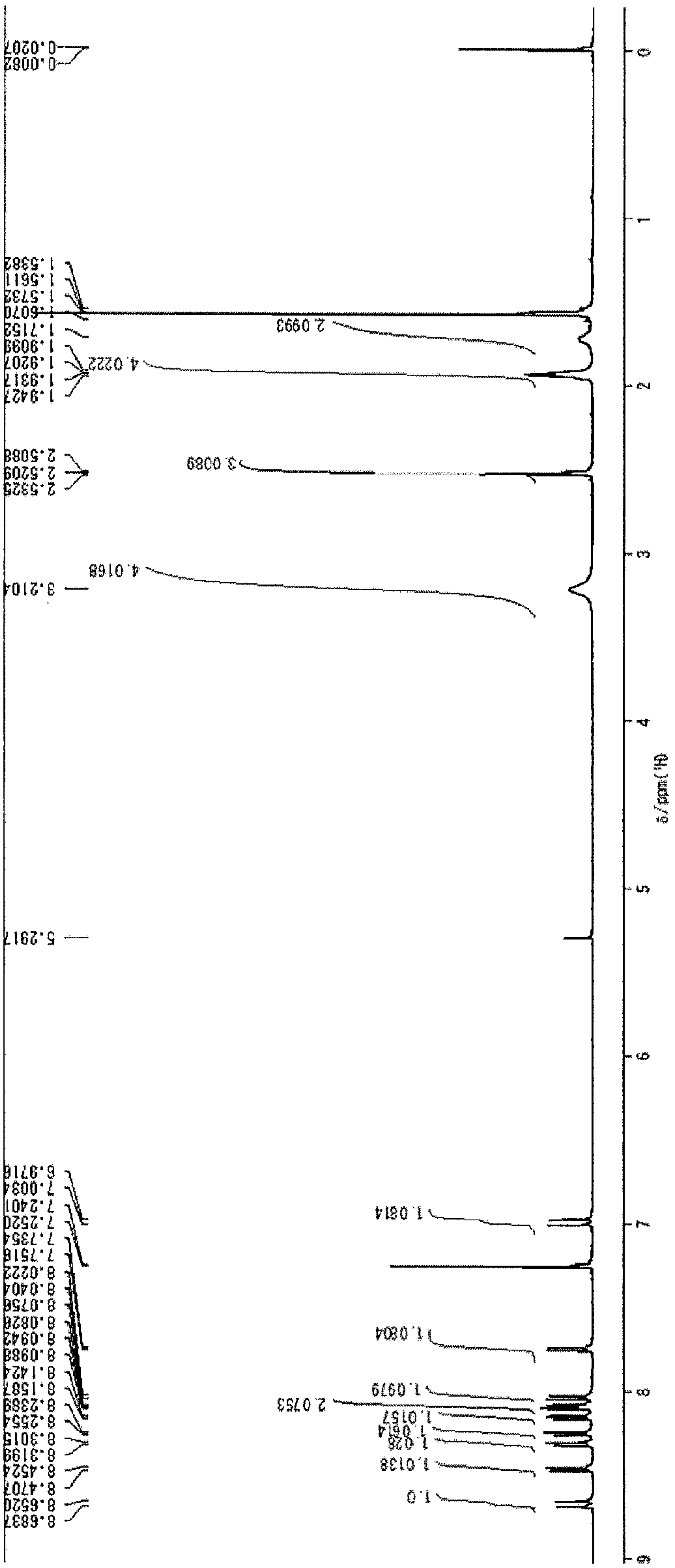
FIG. 9 is a chart of $^1$H NMR spectrum measurement of the compound B in an Example.

$^{1}$H-NMR Analysis $^{1}$H-NMR analysis was performed using a nuclear magnetic resonance apparatus (JNM-LA500 manufactured by JEOL Ltd.). The results obtained with the compound B are shown below and in FIG. 9.

$^{1}$H NMR (500 MHZ, $CDCl_3$, TMS) δ: 8.67 (d, J=16.0, 1H), 8.46 (d, J=9.1, 1H), 8.31 (d, J=9.2, 1H), 8.25 (d, J=8.2, 1H), 8.15 (d, J=8.2, 1H), 8.09 (d, J=8.1, 1H), 8.09 (d, J=9.2, 1H), 8.03 (d, J=9.1, 1H), 7.75 (d, J=8.1, 1H), 7.00 (d, J=16.0, 1H), 3.21 (br, 4H), 2.52 (s, 3H), 1.91-1.94 (m, 4H), 1.72 (br, 2H).

High-Resolution Mass Spectrometry

The high-resolution mass spectrometry was performed using a high-resolution mass spectrometer (JMS-700 manufactured by JEOL Ltd.). The results obtained with the compound B are shown below.

HRMS (ESI), m/z: [M] calcd for $C_{25}H_{23}NO$, 353.1780; found, 353.1773.

Example 9

Measurement of Photophysical Properties of Compound B in Organic Solvent

The absorption spectrum and fluorescence spectrum in organic solvents of the compound B obtained in Example 8 were measured.

The absorption spectrum and the fluorescence spectrum were measured using a UV-Visible/NIR spectrophotometer (V-670 manufactured by JASCO Corporation) and a spectrofluorometer (FP6600 manufactured by JASCO Corporation), respectively, in the same manner as in Example 2. The fluorescence quantum yield was measured using an absolute PL quantum yield spectrometer (Hamamatsu Photonics K.K.: C 9920-02V). The concentration of the compound B was 5 μM for each solvent. For solvent species, toluene, dichloromethane, DMSO, and ethanol were used. The obtained results are shown in FIG. 10.

Figure 10:
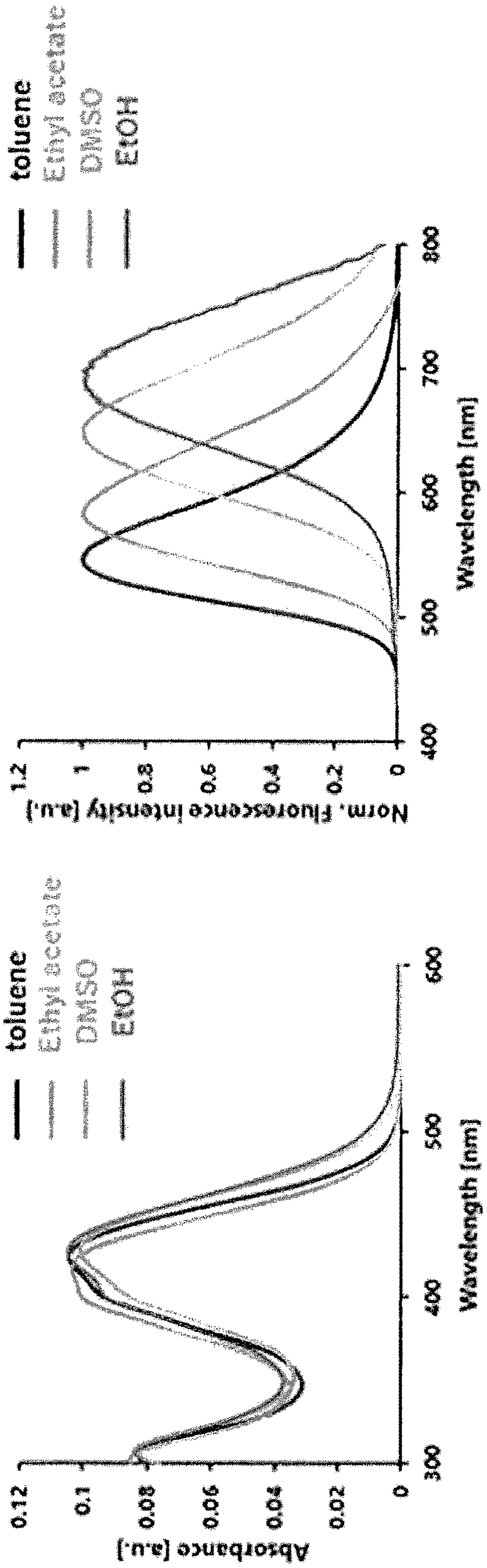
FIG. 10 includes a chart (left) of absorption spectrum measurement and a chart (right) of fluorescence spectrum measurement (normalized) of the compound B in an organic solvent in an Example.

As shown in FIG. 10, the maximum absorption wavelengths were almost the same value irrespective of the solvent species, but the maximum fluorescence wavelengths were different depending on the solvent species. More specifically, in polar solvents, an increase in the fluorescence wavelength was observed, and fluorescence solvatochromism sensitive to solvent polarity was observed in polar solvents.

Example 10

Synthesis of Compound C

The synthesis of the compound C was performed as in the following scheme.

[Formula 6]

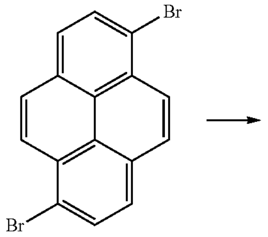

1, 6-dibromopyrene

-continued

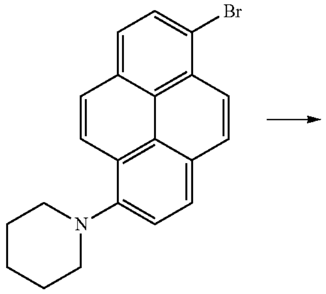

2

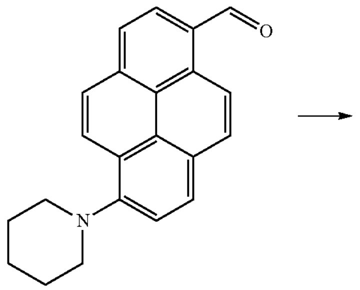

1

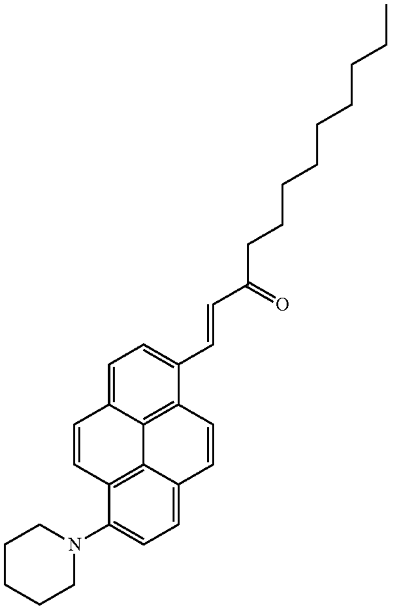

C

A 1 M aqueous sodium hydroxide solution (0.5 mL) and dehydrated ethanol (3 mL) were added to known compound 1 (50 mg, 0.16 mmol) and 2-undecanone (48 μL, 0.24 mmol), and the obtained solution was heated and stirred at 60 °C for 4 hours under an argon atmosphere, affording compound C.

To the solution obtained was added water, and the resulting precipitate was collected by filtration.

The precipitate obtained as described above was purified by silica gel column chromatography (dichloromethane: hexane=2:1), and further recrystallized from acetonitrile, affording a target compound C. (yield amount: 15 mg, yield percent: 13%)

Figure 11:
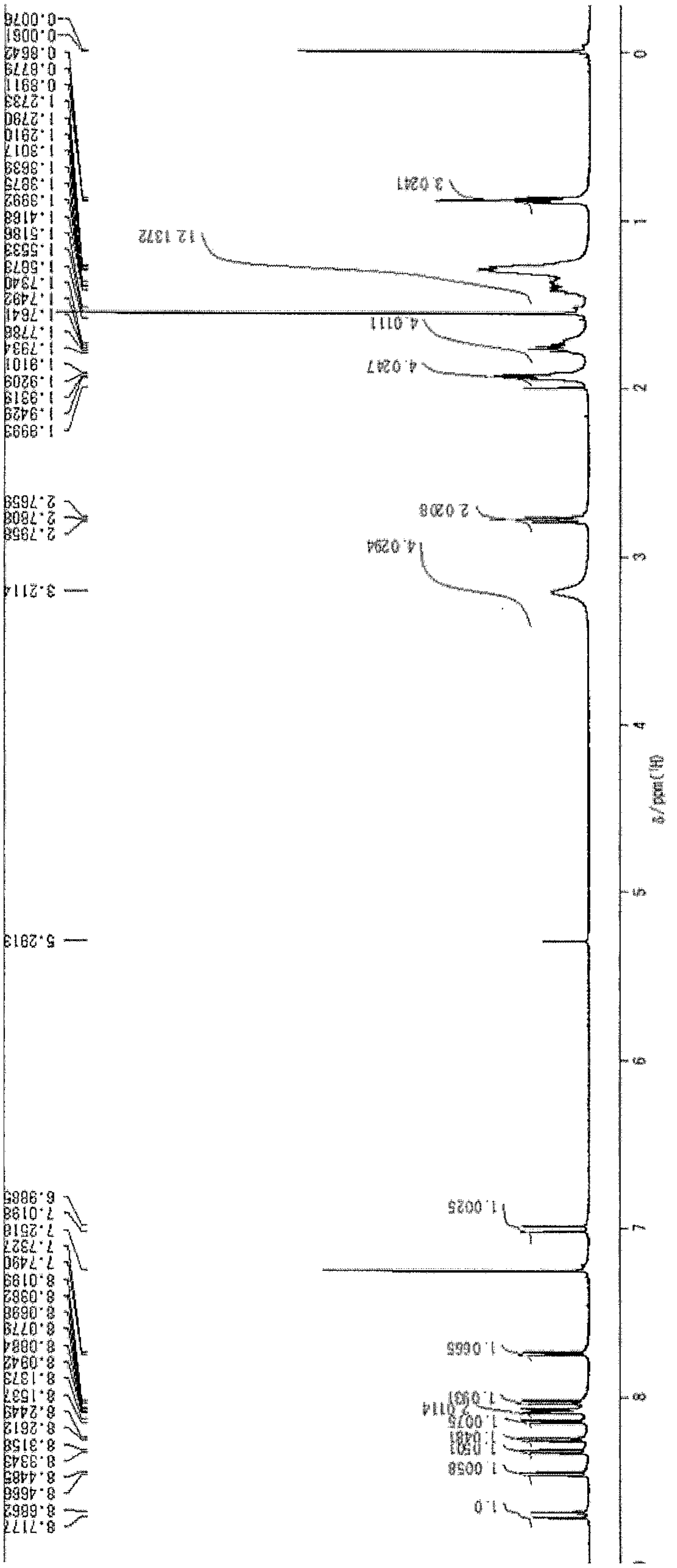
FIG. 11 is a chart of $^1$H NMR spectrum measurement of the compound C in an Example.

$^1$H-NMR Analysis $^1$H-NMR analysis was performed using a nuclear magnetic resonance apparatus (JNM-LA500 manufactured by JEOL Ltd.). The results obtained with the compound C are shown below and in FIG. 11.

$^1$H NMR (500 MHZ, $CDCl_3$, TMS) δ: 8.71 (d, J=15.8, 1H), 8.45 (d, J=9.1, 1H), 8.33 (d, J=9.1, 1H), 8.25 (d, J=8.2, 1H), 8.15 (d, J=8.2, 1H), 8.09 (d, J=8.3, 1H), 8.07 (d, J=9.2, 1H), 8.03 (d, J=9.2, 1H), 7.74 (d, J=8.3, 1H), 7.01 (d, J=15.8, 1H), 3.21 (br, 4H), 2.78 (t, J=7.1, 2H), 1.91-1.94 (m, 4H), 1.73-1.79 (m, 2H), 1.73 (br, 2H), 1.27-1.41 (m, 12H), 0.88 (t, J=6.7, 3H).

High-Resolution Mass Spectrometry

The high-resolution mass spectrometry was performed using a high-resolution mass spectrometer (JMS-700 manufactured by JEOL Ltd.). The results obtained with the compound C are shown below.

HRMS (ESI), m/z: $[MNa]^+$ calcd for $C_{33}H_{39}NO$, 488.2924; found, 488.2924.

Example 11

Measurement of Photophysical Properties of Compound C in Organic Solvent

The absorption spectrum and fluorescence spectrum in organic solvents of the compound C obtained in Example 10 were measured.

The absorption spectrum and the fluorescence spectrum were measured using a UV-Visible/NIR spectrophotometer (V-670 manufactured by JASCO Corporation) and a spectrofluorometer (FP6600 manufactured by JASCO Corporation), respectively, in the same manner as in Example 2. The fluorescence quantum yield was measured using an absolute PL quantum yield spectrometer (Hamamatsu Photonics K.K.: C 9920-02V). The concentration of the compound C was 5 μM for each solvent. For solvent species, toluene, dichloromethane, DMSO, and ethanol were used. The obtained results are shown in FIG. 12.

Figure 12:
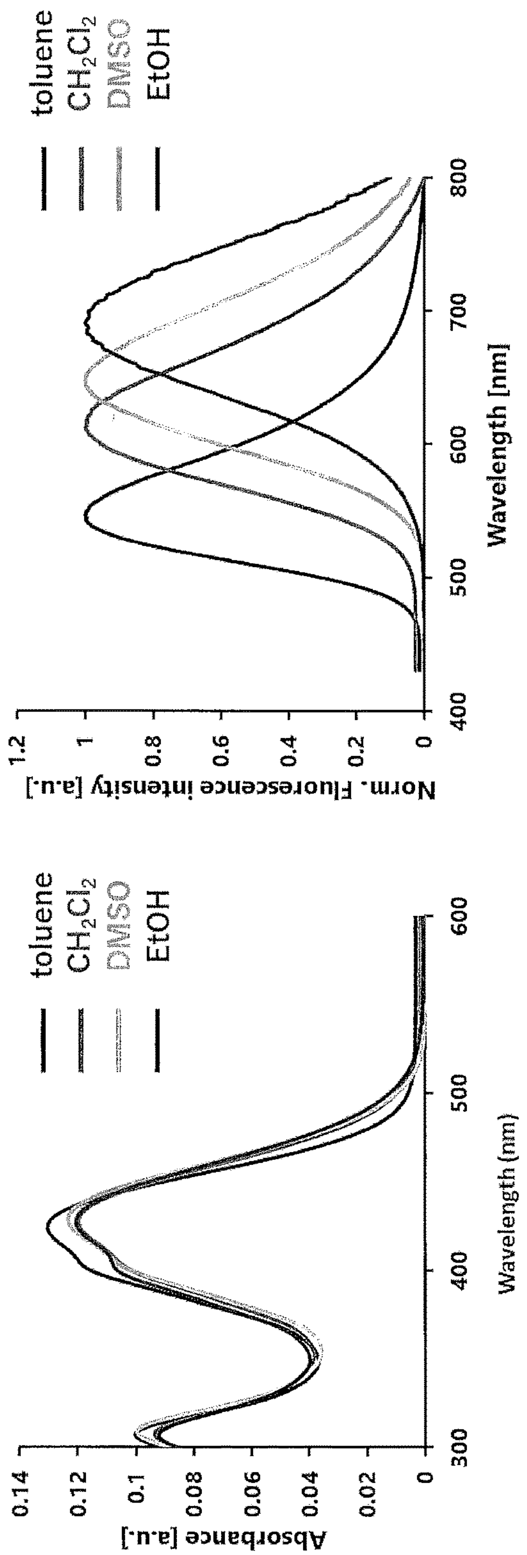
FIG. 12 includes a chart (left) of absorption spectrum measurement and a chart (right) of fluorescence spectrum measurement (normalized) of the compound C in an organic solvent in an Example.

As shown in FIG. 12, the maximum absorption wavelengths were almost the same value irrespective of the solvent species, but the maximum fluorescence wavelengths were different depending on the solvent species. More specifically, in polar solvents, an increase in the fluorescence wavelength was observed, and fluorescence solvatochromism sensitive to solvent polarity was observed in polar solvents.

The invention claimed is:

1. A compound represented by the following formula (1) or a salt thereof:

[Formula 1]

(1)

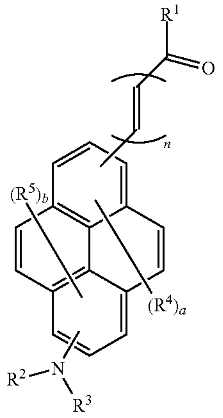

in the formula (1), $R^1$ is a substituted or unsubstituted alkyl group having 1 to 12 carbon atoms, a substituted or unsubstituted alkenyl group having 2 to 12 carbon atoms, a substituted or unsubstituted alkynyl group having 2 to 12 carbon atoms, or a hydrophilic substituent containing one or more atoms selected from the group consisting of boron, nitrogen, oxygen, phosphorus, sulfur, and halogen;

$R^2$ and $R^3$ are each independently a substituted or unsubstituted alkyl group having 1 to 6 carbon atoms, a substituted or unsubstituted alkenyl group having 2 to 6 carbon atoms, a substituted or unsubstituted alkynyl group having 2 to 6 carbon atoms, or a hydrophilic substituent containing one or more atoms selected from the group consisting of boron, nitrogen, oxygen, phosphorus, sulfur, and halogen, and $R^2$ and $R^3$ may form one ring structure together;

$R^4$ and $R^5$ are each independently an alkyl group having 1 to 12 carbon atoms, an alkenyl group having 2 to 12 carbon atoms, an alkynyl group having 2 to 12 carbon atoms, an aryl group having 5 to 12 carbon atoms, a heteroaryl group having 5 to 12 carbon atoms, a halogen atom, or a hydrophilic substituent containing one or more atoms selected from the group consisting of boron, nitrogen, oxygen, phosphorus, sulfur, and halogen;

n is an integer of 1 to 4; and a and b are each independently an integer of 0 to 4.

2. The compound according to claim 1 or a salt thereof, wherein n is 1 or 2.

3. The compound according to claim 1 or a salt thereof, wherein $R^1$ is a methyl group, an ethyl group, a n-propyl group, an i-propyl group, a n-butyl group, an i-butyl group, a sec-butyl group, or a t-butyl group.

4. The compound according to any one of claim 1 or a salt thereof, wherein $R^2$ and $R^3$ are each independently a methyl group, an ethyl group, a n-propyl group, an i-propyl group, a n-butyl group, an i-butyl group, a sec-butyl group, or a t-butyl group each of which is substituted or unsubstituted with a carboxyl group, a hydroxy group, a sulfo group, an amide group, a halogen atom, or a group being a salt of a carboxyl group, a hydroxy group, a sulfo group, an amide group, or a halogen atom.

5. The compound according to claim 1 or a salt thereof, wherein $R^2$ and $R^3$ represent together a divalent cyclic hydrocarbon group having 3 to 12 carbon atoms that is constituted by combining $R^2$ and $R^3$ together with the carbon atoms to which $R^2$ and $R^3$ are bound and that is substituted or unsubstituted with a carboxyl group, a hydroxy group, a sulfo group, an amide group, a halogen atom, or a group being a salt of a carboxyl group, a hydroxy group, a sulfo group, an amide group, or a halogen atom.

6. The compound according to claim 1 or a salt thereof, wherein $R^4$ and $R^5$ are each independently a methyl group, an ethyl group, a hydroxyl group, or an amino group.

7. The compound according to claim 1 or a salt thereof, wherein an absorption maximum wavelength thereof is 300 to 550 nm in a 20 mM phosphate buffer at pH 7.4 and at 25 °C.

8. The compound according to claim 1 or a salt thereof, having a molecular weight of 700 or less.

9. A fluorescent dye comprising the compound according to claim 1 or a salt thereof.

10. The fluorescent dye according to claim 9, which is for morphological detection of cells.

11. The fluorescent dye according to claim 9, which is for staining or visualization of a biological sample.

12. The fluorescent dye according to claim 9, which is for fluorescence imaging.

13. A kit comprising the fluorescent dye according to claim 9.

14. A method for detecting cells, comprising step (1) of staining a cell with a fluorescent dye including the compound according to claim 1 or a salt thereof, and after the step (1), step (2) of performing evaluation using fluorescence spectra measured in two or more solvents, respectively.

15. The method for detecting cells according to claim 14, wherein the step (2) is performed using fluorescence imaging.

* * * * *